(12) United States Patent
Fukamachi et al.

(10) Patent No.: US 7,773,956 B2
(45) Date of Patent: Aug. 10, 2010

(54) MULTI-BAND HIGH FREQUENCY CIRCUIT, MULTI-BAND HIGH-FREQUENCY COMPONENT AND MULTI-BAND COMMUNICATIONS APPARATUS

(75) Inventors: Keisuke Fukamachi, Saitama-ken (JP); Shigeru Kemmochi, Saitama-ken (JP); Kazuhiro Hagiwara, Saitama-ken (JP); Takahiro Yamashita, Saitama-ken (JP); Masayuki Uchida, Tottoti-ken (JP)

(73) Assignee: Hitachi Metals, Ltd., Tokyo (JP)

( * ) Notice: Subject to any disclaimer, the term of this patent is extended or adjusted under 35 U.S.C. 154(b) by 678 days.

(21) Appl. No.: 11/571,416

(22) PCT Filed: Jun. 29, 2005

(86) PCT No.: PCT/JP2005/012003

§ 371 (c)(1),
(2), (4) Date: Dec. 28, 2006

(87) PCT Pub. No.: WO2006/003959

PCT Pub. Date: Jan. 12, 2006

(65) Prior Publication Data

US 2008/0212552 A1     Sep. 4, 2008

(51) Int. Cl.
*H04B 1/44* (2006.01)
(52) U.S. Cl. .......................................... 455/78; 333/132
(58) Field of Classification Search .................. 455/73, 455/76–78, 80–86, 101, 127.1, 127.2, 127.3, 455/127.4, 132, 133, 137, 255, 260, 266, 455/272, 273, 307, 339, 340, 552.1, 553.1; 375/219, 267; 343/21, 822, 852, 859, 860, 343/869; 333/4, 5, 25, 100, 101, 126–129, 333/132, 134, 176, 219
See application file for complete search history.

(56) References Cited

U.S. PATENT DOCUMENTS

| 4,816,788 | A | * | 3/1989 | Ishikawa et al. ............. 333/203 |
| 5,705,960 | A | * | 1/1998 | Izumiyama .................. 333/26 |
| 5,880,649 | A | | 3/1999 | Tai et al. |
| 6,366,564 | B1 | | 4/2002 | Hiraka et al. |

(Continued)

FOREIGN PATENT DOCUMENTS

JP     09-29042 A     11/1997

(Continued)

*Primary Examiner*—Patrick N Edouard
*Assistant Examiner*—Anthony S Addy
(74) *Attorney, Agent, or Firm*—Sughrue Mion, PLLC

(57) ABSTRACT

A high-frequency circuit comprising a switch circuit for properly switching the connection of an antenna terminal and four input/output terminals; a first received-signal output terminal being connected to a receiving circuit of a first communications system via a filter circuit; a second received-signal output terminal being connected to a receiving circuit of a second communications system via a filter circuit; a first transmitting-signal input terminal being connected to a transmitting circuit of a first communications system; and a second transmitting-signal input terminal being connected to a transmitting circuit of a second communications system via a power amplifier circuit, the high-frequency circuit further comprising a bandpass filter circuit disposed in any one or more paths between the antennas and the transmitting-signal input or received-signal output; and a detection circuit having a voltage detection terminal for monitoring the output power of the power amplifier circuits.

20 Claims, 19 Drawing Sheets

U.S. PATENT DOCUMENTS

| | | | |
|---|---|---|---|
| 6,563,396 B2 * | 5/2003 | Tanaka et al. | 333/133 |
| 6,624,700 B2 * | 9/2003 | Luo et al. | 330/281 |
| 6,633,748 B1 | 10/2003 | Watanabe et al. | |
| 6,728,517 B2 * | 4/2004 | Sugar et al. | 455/73 |
| 6,835,968 B2 * | 12/2004 | Kitazawa et al. | 257/107 |
| 6,867,662 B2 * | 3/2005 | Uriu et al. | 333/132 |
| 6,987,984 B1 | 1/2006 | Kemmochi et al. | |
| 6,995,630 B2 | 2/2006 | Satoh et al. | |
| 7,010,273 B2 | 3/2006 | Satoh et al. | |
| 7,035,602 B2 * | 4/2006 | Satoh et al. | 455/118 |
| 7,057,472 B2 | 6/2006 | Fukamachi et al. | |
| 7,135,943 B2 * | 11/2006 | Lin et al. | 333/132 |
| 7,259,621 B2 * | 8/2007 | Kusunoki et al. | 330/149 |
| 7,471,930 B2 * | 12/2008 | Okuyama et al. | 455/78 |
| 2002/0183016 A1 * | 12/2002 | Kemmochi et al. | 455/83 |
| 2004/0048634 A1 | 3/2004 | Satoh et al. | |
| 2004/0240420 A1 | 12/2004 | Nakai | |
| 2007/0075803 A1 * | 4/2007 | Kemmochi et al. | 333/132 |

FOREIGN PATENT DOCUMENTS

| | | |
|---|---|---|
| JP | 11-031905 A | 2/1999 |
| JP | 2000-201097 A | 7/2000 |
| JP | 2001274723 | 10/2001 |
| JP | 2002-064301 A | 2/2002 |
| JP | 2003-018039 A | 1/2003 |
| JP | 2003087150 | 3/2003 |
| JP | 2003-152588 A | 5/2003 |
| JP | 2003-152590 A | 5/2003 |
| JP | 2003169008 | 6/2003 |
| JP | 2004-032674 A | 1/2004 |
| WO | 03-036806 A1 | 5/2003 |
| WO | WO03092997 A2 | 11/2003 |

* cited by examiner (a)

(b)

(c)

(a)

(b)

(a)

(b)

MULTI-BAND HIGH FREQUENCY CIRCUIT, MULTI-BAND HIGH-FREQUENCY COMPONENT AND MULTI-BAND COMMUNICATIONS APPARATUS

FIELD OF THE INVENTION

The present invention relates to a high-frequency circuit commonly usable in at least two communications systems for wireless communications between electronic apparatuses, a high-frequency component comprising such high-frequency circuit, and a multi-band communications apparatus comprising it.

BACKGROUND OF THE INVENTION

Data communications by wireless LAN (WLAN) typically according to the IEEE802.11 standards are now widely used. They are used in personal computers (PCs); PC peripherals such as printers, memory apparatuses, broadband rooters, etc.; electronic appliances such as facsimiles, refrigerators, standard-definition televisions (SDTVs), high-definition televisions (HDTVs), digital cameras, digital video-cameras, cell phones, etc.; mobile vehicles such as automobiles, aircrafts, etc., to conduct wireless data communications between wireless signal-transmitting devices, etc.

There are now pluralities of standards of wireless LAN. Among them, IEEE802.11a is adapted to high-speed data communications of 54 Mbps at maximum in a frequency band of 5 GHz, using an OFDM (orthogonal frequency division multiples) modulation system. IEEE802.11b is adapted to high-speed communications of 5.5 Mbps and 11 Mbps by a direct sequence spread spectrum (DSSS) system in an industrial, scientific and medical (ISM) band of 2.4 GHz that can be freely used without license for wireless communications. IEEE802.11g is adapted to high-speed data communications of 54 Mbps at maximum in a 2.4-GHz band like IEEE802.11b, using the OFDM (orthogonal frequency division multiples) modulation system. Explanation will be made below using IEEE802.11b and IEEE802.11g as a first communications system, and IEEE802.11a as a second communications system.

An example of multi-band communications apparatuses using such WLAN is described in JP2003-169008A. As shown in FIG. 32, this multi-band communications apparatus comprises two dual-band antennas capable of transmitting and receiving in two communications systems having different communication frequency bands (IEEE802.11a, IEEE802.11b), two transmitting/receiving means for modulating transmitting data and demodulating received data in each communications system, pluralities of switch means for connecting the antennas to the transmitting/receiving means, and a means for controlling the switch means, so that it can perform diversity receiving.

In this multi-band communications apparatus, frequency scanning is conducted before starting communications to detect receivable frequency channels. To conduct this scanning operation, the antenna ANT1 is connected to a receiving terminal Rx of the transmitting/receiving means of 802.11a, and the antenna ANT2 is connected to a receiving terminal Rx of the transmitting/receiving means of 802.11b, by six single-pole, dual-throw (SPDT) switch means (SW1-SW6). The transmitting/receiving means of 802.11a is scanned in a 5-GHz band, and the transmitting/receiving means of 802.11b is scanned in a 2.4-GHz band, to sense all receivable vacant channels. A signal received by the antenna ANT1 and a signal received by the antenna ANT2 are then compared to activate a system receiving a more desired signal among the two communications systems.

After this scanning operation, the activated transmitting/receiving apparatus is connected to the other antenna, to receive the signal without changing the receiving channel. The two received signals thus obtained are compared, and an antenna receiving a better signal is activated to conduct diversity receiving.

It has been found, however, that such multi-band communications apparatuses suffer from the following problems.

(1) Because disturbance such as phasing, etc. is not taken into consideration in the scanning operation, a communications system receiving the maximum signal is not necessarily selected.

(2) Because many switch means are needed for switching high-frequency signal paths, (a) their control is complicated; (b) the communications loss of the switch means is accumulated, particularly resulting in the deterioration of quality of a high-frequency signal entering through the antenna; and (c) power consumed by the operation of the switch means is not negligible in apparatuses with batteries as power supplies, such as note PCs, cell phones, etc.

(3) High-frequency circuits for WLAN also need filter circuits for removing unnecessary frequency components contained in transmitting signals and received signals, in addition to diversity switches and switch circuits for switching transmitting circuits and receiving circuits. Further, balanced-to-unbalanced converters for converting balanced signal to unbalanced signals, and impedance-converting circuits are needed.

(4) When contained in cell phones or note PCs, or used as network cards of PCMCIA (personal computer memory card international association), it is desired to miniaturize multi-band communications apparatuses.

OBJECTS OF THE INVENTION

Accordingly, the first object of the present invention is to provide a high-frequency circuit commonly usable in at least two communications systems, which can activate a communications system receiving the most desired signal among pluralities of communications systems for diversity receiving.

The second object of the present invention is to provide a multi-band high-frequency circuit capable of switching the connection of multi-band antennas to transmitting circuits and receiving circuits with a few switch means.

The third object of the present invention is to provide a multi-band high-frequency circuit, which comprises a filter circuit, a balanced-to-unbalanced converter and an impedance-converting circuit.

The fourth object of the present invention is to provide a high-frequency component having a small three-dimensional laminate structure with the high-frequency circuit.

The fifth object of the present invention is to provide a multi-band communications apparatus comprising a transmitting/receiving means for modulating transmitting data and demodulating received data in each communications system, and a switch circuit controller for controlling the high-frequency switches.

DISCLOSURE OF THE INVENTION

The high-frequency circuit of the present invention, which is used in a dual-band wireless apparatus for wireless communications selectively using first and second frequency bands, comprises one or more antenna terminals each connected to an antenna capable of transmitting and receiving signals in the first and second frequency bands;

a first transmitting terminal, to which a transmitting signal in the first frequency band is input;

a second transmitting terminal, to which a transmitting signal in the second frequency band is input;

a first receiving terminal, from which a received signal in the first frequency band is output;

a second receiving terminal, from which a received signal in the second frequency band is output;

a switch circuit for switching the connection between the antenna terminal and the first and second transmitting terminals or the first and second receiving terminals;

a first power amplifier circuit disposed between the switch circuit and the first transmitting terminal;

a second power amplifier circuit disposed between the switch circuit and the second transmitting terminal;

a bandpass filter circuit disposed between the antenna terminal and at least one of the first and second transmitting and receiving terminals; and a detection circuit having a voltage detection terminal for monitoring the output power of the first and second power amplifier circuits.

To enable a diversity operation, a DPDT (dual-pole, dual-throw) switch circuit for switching two antenna terminals and transmitting/receiving paths is preferably used as a switch circuit, but an SPDT (single-pole, dual-throw) switch circuit for switching one antenna terminal and transmitting/receiving paths, etc. may be used. The DPDT switch circuit and the SPDT switch circuit may be properly exchanged depending on the communications systems, the number of antennas, etc.

The bandpass filter passes a high-frequency signal in the first or second passband while attenuating a signal outside the passband, thereby reducing noise.

The switch circuit preferably comprises a first diplexer circuit disposed on the transmitting terminal side for permitting a high-frequency signal from one of the first and second transmitting terminals to go to the antenna terminal side but not to the other transmitting terminal, and a second diplexer circuit disposed on the receiving terminal side for dividing a high-frequency signal received through the antenna terminal to the first or second receiving terminal. Because the diplexer circuit causes signals in the first and second frequency bands to pass through one path, the operation of the high-frequency switch in the switch circuit is only switching of transmitting and receiving, resulting in the simplified control of the switch circuit. Also, using the diplexer circuit is more advantageous than using the high-frequency switch circuit in insertion loss in a 5-GHz band used in wireless LAN, etc., the amount of harmonics generated during high-power input, parts cost, etc.

The first or second diplexer circuit comprises a low-frequency filter circuit and a high-frequency filter circuit, and the low-frequency filter circuit is preferably constituted by a phase line connected to a common terminal of the diplexer circuits, and a bandpass filter circuit connected to the phase line. It is general to use a lowpass filter circuit as the low-frequency filter circuit, which is connected on the downstream side to the bandpass filter circuit, but if the impedance of the bandpass filter circuit outside the passband is adjusted by the phase line such that it functions like a lowpass filter, the lowpass filter can be omitted, resulting in the reduction of insertion loss, and the miniaturization and cost reduction of the circuit.

The detection circuit preferably comprises a coupling circuit connected to the output paths of the first and second power amplifier circuits, and a detection diode connected to the coupling terminal of the coupling circuit, whereby a high-frequency signal is caused to pass through the coupling circuit so that its high-frequency power is detected by the detection diode, and the detected voltage is output to the voltage detection terminal. The output power of the power amplifier circuit can be monitored by the detected voltage appearing at the voltage detection terminal. The coupling circuit and the detection diode may be contained in a power amplifier MMIC (monolithic microwave integrated circuit), but because detected voltage may vary when the output-matching conditions of the power amplifier change, it is desired to dispose the coupling circuit near the antenna terminal. A directional coupling circuit is more desirable than a capacitance-coupling circuit as the coupling circuit. The use of the directional coupling circuit reduces the influence of waves reflected by the antenna, so that the output power can be monitored at high precision even if the impedance of the antenna changes.

The coupling circuit may be connected to a common terminal of the first diplexer circuit or an antenna terminal. This makes it unnecessary to dispose a coupling circuit, a detection diode and a voltage detection terminal in each of first and second power amplifier circuits, resulting in the miniaturization and cost reduction of the high-frequency circuit.

A harmonics-reducing circuit is disposed between the coupling terminal of the coupling circuit and the detection diode. The harmonics-reducing circuit, which reduces harmonic distortion generated by the detection diode, has such a structure as a lowpass filter circuit, a notch filter circuit, an attenuator circuit, etc. Although the harmonics-reducing circuit is generally disposed in a main path for passing transmitting/received signals, it is disposed between the coupling circuit and the detection diode in the high-frequency circuit of the present invention. This can suppress the communications loss of the main path for passing transmitting/received signals, achieving high-quality communications with low power consumption.

A lowpass filter circuit or a notch filter circuit is preferably disposed between the power amplifier circuit and the antenna terminal. This can reduce the harmonic distortion of a high-frequency signal output from the power amplifier circuit, thereby reducing harmonics radiated from the antenna terminal to a practically acceptable level.

A balanced-unbalanced conversion circuit may be connected to at least one of the first and second transmitting terminals. The balanced-unbalanced conversion circuit may be connected to at least one of the first and second receiving terminals. The transmitting terminal and receiving terminal of the high-frequency circuit of the present invention are connected to RFIC, but because the balanced input and output are higher than the unbalanced input and output in noise resistance, the RFIC has a balanced-input, balanced-output type in many cases. Also, because the power amplifier circuit, the switch circuit, etc. used in the high-frequency circuit of the present invention are unbalanced devices, a balanced-unbalanced conversion circuit should be disposed as an interface to the RFIC in many cases. Accordingly, the addition of a balanced-unbalanced conversion circuit to the high-frequency circuit of the present invention enables the miniaturization and cost reduction of the communications apparatus.

A matching circuit is preferably disposed on the side of an unbalanced input of the balanced-unbalanced conversion circuit. The matching circuit is necessary for matching the balanced-unbalanced conversion circuit and the diplexer circuit, the bandpass filter circuit, the power amplifier circuit, etc. connected thereto, thereby reducing insertion loss in the passband.

The balanced-unbalanced conversion circuit may have a DC feed terminal. The DC feed terminal applies DC voltage to the balanced input or output terminal of RFIC, to which the high-frequency circuit of the present invention is connected, making an additional choke coil unnecessary and thus achieving the miniaturization and cost reduction of the communications apparatus.

A low-noise amplifier circuit may be connected to at least one of the first and second receiving terminals. The low-noise amplifier has a function to amplify a weak received signal detected by the antenna, thereby improving the receiving sensitivity. It is natural to use a low-noise amplifier with a small noises index to improve the receiving sensitivity, and the reduction of loss on the input side of the low-noise amplifier is also effective to improve the receiving sensitivity. The arrangement of the low-noise amplifier circuit in the high-frequency circuit can shorten connection on the input side of the low-noise amplifier, so that the receiving sensitivity becomes higher than when an external low-noise amplifier is used.

A lowpass filter circuit or a notch filter circuit is preferably disposed between the low-noise amplifier circuit and the antenna terminal. The lowpass filter circuit has a function to reduce harmonic distortion generated by the low-noise amplifier circuit. Specifically, part of a high-power signal output from the first or second power amplifier circuit at the time of communications is input to the low-noise amplifier via the switch circuit, so that harmonics are generated by the turned-off low-noise amplifier. The harmonics are radiated from the antenna as reflected waves. To prevent the radiation of harmonics, it is effective to dispose a lowpass filter circuit or a notch filter circuit between the low-noise amplifier circuit and the antenna terminal.

It is preferable that the first or second power amplifier circuit is an amplifier having two or more stages of amplifying transistors, and that a bandpass filter circuit is disposed between the input side of a last-stage transistor and the output side of a penultimate-stage transistor in the amplifier. With this structure, noise outside the passband in the output of the power amplifier can be reduced. Because the bandpass filter circuit is not connected to the output of the power amplifier circuit, it is possible to prevent the power amplifier from consuming more current due to the insertion loss of the bandpass filter and deteriorating in efficiency.

The bandpass filter preferably comprises two or more transmitting line resonators each having one end grounded as main components. Thus, the bandpass filters are integrated in the laminate substrate, and the power amplifier circuits are mounted on the laminate substrate, providing a small laminate module. It also suffers less temperature shift of resonance frequency than when a surface acoustic wave filter is used as the bandpass filter and does not need sealing.

The high-frequency component of the present invention having the above high-frequency circuit comprises an integral laminate of pluralities of dielectric ceramic layers with electrode patterns formed by conductive paste, and at least one element mounted on a surface of the laminate; at least part of inductance elements and capacitance elements in the high-frequency circuit being constituted by the electrode patterns; and at least one semiconductor element constituting the switch circuits, the power amplifier circuits and the low-noise amplifier circuit being mounted on a surface of the laminate substrate. Apart from the semiconductor elements, inductance elements, capacitance elements, resistance elements, etc. may be mounted on the laminate, if necessary. The present invention provides a small high-frequency component, in which front-end parts from the antennas to RFIC are integrated in the laminate.

The multi-band communications apparatus of the present invention using the above high-frequency circuit or component comprises a transmitting/receiving part for demodulating transmitting data and received data in each communications system, and a circuit control part for controlling the switch circuits, the power amplifier circuits and the low-noise amplifier circuit. The multi-band communications apparatus of the present invention achieves miniaturization, and the reduction of power consumption and cost.

DESCRIPTION OF THE PREFERRED EMBODIMENTS

Figure 1:
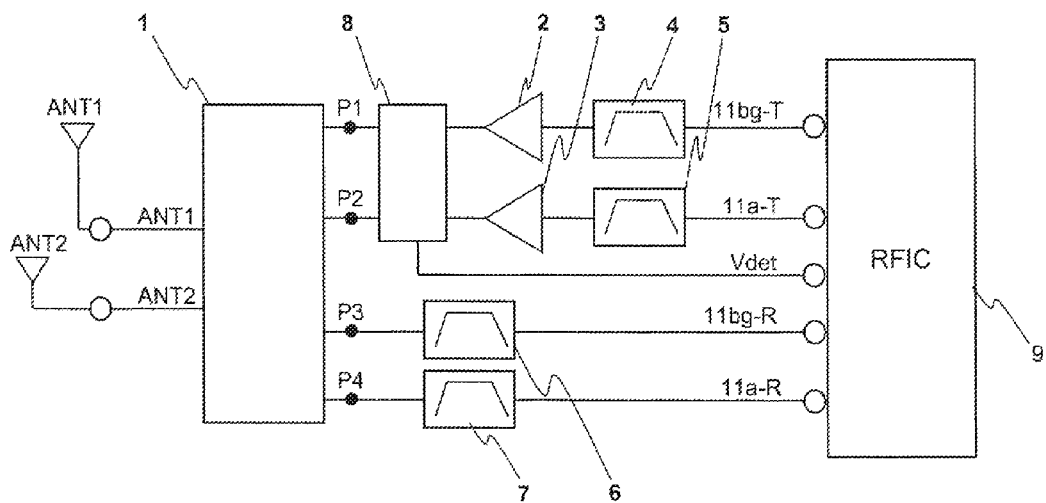
FIG. 1 is a block diagram showing a high-frequency circuit according to one embodiment of the present invention.

FIG. 1 shows the circuit of the multi-band communications apparatus according to one embodiment of the present invention. Taking for example IEEE802.11b as a first communications system and IEEE802.11a as a second communications system, the circuit of this embodiment will be specifically explained. Because both IEEE802.11g and IEEE802.11b use the same frequency band as described above, a circuit part handling the high-frequency signal of IEEE802.11b can be used for IEEE802.11g. When both IEEE802.11b and IEEE802.11g are handled, a transmitting/receiving part for each of them is needed because they use different modulation systems.

This multi-band communications apparatus comprises two multi-band antennas ANT1, ANT2 capable of transmitting and receiving signals in 2.4-GHz and 5-GHz bands, a switch circuit 1 connected to the two multi-band antennas ANT1, ANT2 for switching the connection between a transmitting circuit and a receiving circuit, a 2.4-GHz-band power amplifier circuit 2 connected to a first transmitting-signal input P1 of the switch circuit 1, a 5-GHz-band power amplifier circuit 3 connected to a second transmitting-signal input P2 of the switch circuit 1, a detection circuit 8 connected to the outputs of the power amplifier circuits 2, 3, and bandpass filter circuits 4-7 connected between the two multi-band antenna terminals ANT1, ANT2 and an RFIC circuit 9. Each input/output terminal is connected to the transmitting/receiving part of IEEE802.11a and the transmitting/receiving part of IEEE802.11b in RFIC 9.

Figure 5:
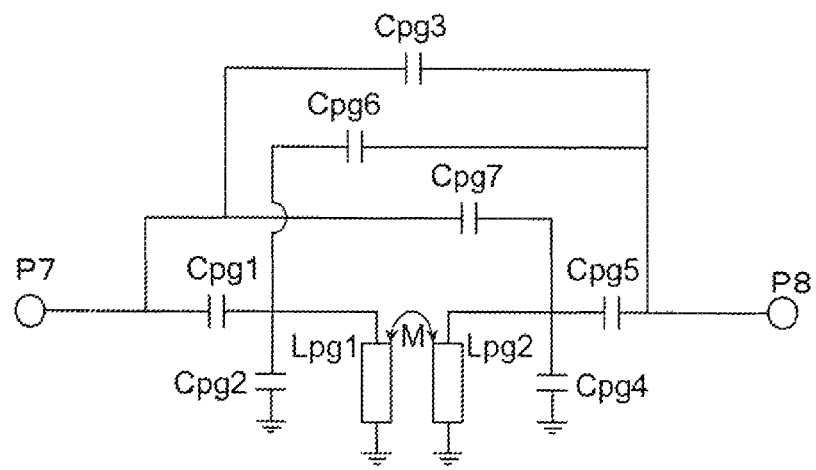
FIG. 5 is a view showing a further example of equivalent circuits of bandpass filter circuits in the high-frequency circuit of the present invention.

The positions of the bandpass filter circuits are not restricted to those shown in FIG. 1, but the bandpass filter circuits may be connected, for instance, between the power amplifier circuit 2 and the switch circuit 1, or between the switch circuit 1 and the antenna terminals. FIG. 5 shows one example of equivalent circuits of the bandpass filters 4-7. This bandpass filter circuit comprises two inductance elements Lpg1, Lpg2, and capacitors Cpg1, Cpg2, Cpg3, Cpg4, Cpg5, Cpg6, Cpg7.

Figure 2:
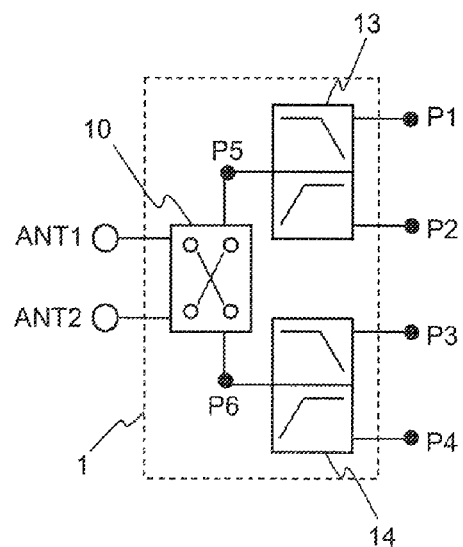
FIG. 2 is a block diagram showing one example of equivalent circuits of switch circuits in the high-frequency circuit of the present invention.

FIG. 2 shows an equivalent circuit of one example of the switch circuit 1. This switch circuit comprises a DPDT (dual-pole, dual-throw) high-frequency switch 10 and two diplexer circuits 13, 14. The high-frequency switch 10 switches the connection between the first and second multi-band antennas ANT1, ANT2 and the first and second diplexer circuits 13, 14.

The first diplexer circuit 13 is constituted by a combination of a filter circuit for passing a high-frequency signal in a 2.4-GHz band (IEEE802.11b) but attenuating a high-frequency signal in a 5-GHz band (IEEE802.11a), and a filter circuit for passing a high-frequency signal in a 5-GHz band (IEEE802.11a) but attenuating a transmitting signal in a 2.4-GHz band (IEEE802.11b). Accordingly, a high-frequency signal in a 2.4-GHz band input from the transmitting circuit of IEEE802.11b to the port P1 of the first diplexer circuit 13 appears at the port P5 of the first diplexer circuit 13 but not at the port P2, and a high-frequency signal in a 5-GHz band input from the transmitting circuit of IEEE802.11a to the port P2 of the first diplexer circuit 13 appears at the port P5 of the first diplexer circuit 13 but not at the port P1. The high-frequency signal appearing at the port P5 is input to the high-frequency switch 10, and output from the antenna terminal ANT1 or ANT2.

The second diplexer circuit 14 is constituted by a combination of a filter circuit for passing a high-frequency signal in a 2.4-GHz band (IEEE802.11b) but attenuating a high-frequency signal in a 5-GHz band (IEEE802.11a), and a filter circuit for passing a high-frequency signal in a 5-GHz band (IEEE802.11a) but attenuating a transmitting signal in a 2.4-GHz band (IEEE802.11b). Accordingly, a high-frequency signal in a 2.4-GHz band among those entering through the antenna ANT1 or ANT2 and appearing at a port P6 of the high-frequency switch 10 appears at a port P3 of the second diplexer circuit 14 but not at a port P4, and a high-frequency signal in a 5-GHz band appears at the port P4 of the second diplexer circuit 14 but not at the port P3.

Figure 3:
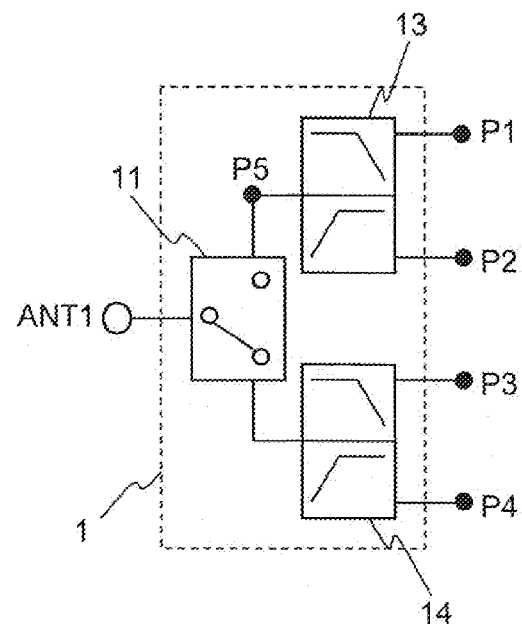
FIG. 3 is a block diagram showing another example of equivalent circuits of switch circuits in the high-frequency circuit of the present invention.
Figure 4:
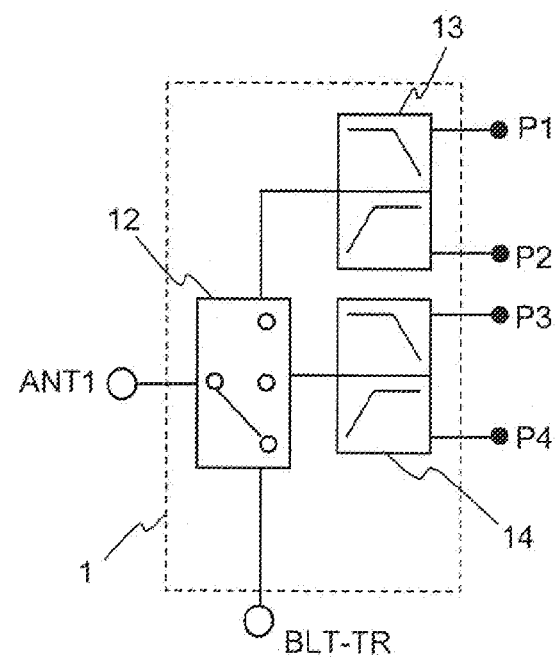
FIG. 4 is a block diagram showing a further example of equivalent circuits of switch circuits in the high-frequency circuit of the present invention.

The high-frequency switch is not restricted to a DPDT switch 10. In the case of a small communications apparatus (for instance, a cell phone), whose mounting area is so limited that two or more antennas cannot be arranged with sufficient distance, one antenna may be connected to the switch circuit 1. In this case, one antenna is connected to an SPDT (single-pole, double-throw) high-frequency switch circuit 11 as shown in FIG. 3, or to an SP3T high-frequency switch 12 as shown in FIG. 4, so that switching to, for instance, the transmitting/receiving terminal BLT-TR of Bluetooth (2.4-GHz band) other than IEEE802.11b and IEEE802.11a can be conducted. As described above, the type of the high-frequency switch may be properly changed depending on handled communications systems, the number of antennas, etc.

Figure 6:
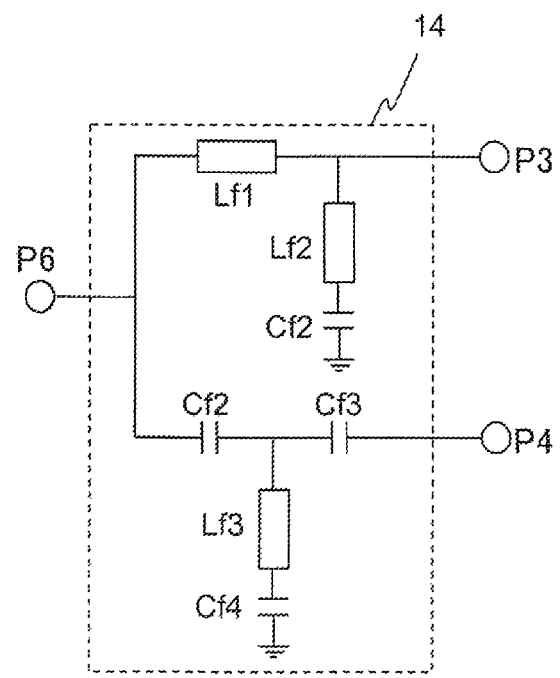
FIG. 6 is a view showing one example of equivalent circuits of diplexer circuits in the high-frequency circuit of the present invention.

The diplexer circuit 13, 14 may be constituted by a proper combination of a lowpass filter circuit, a highpass filter circuit and a notch filter circuit each comprising inductance elements and capacitance elements. FIG. 6 shows one example of the diplexer circuit 14. The diplexer circuit 14 is constituted by, for instance, a lowpass filter circuit connected between P6 and P3, and a highpass filter circuit connected between P6 and P4, such that an inductance element Lf2 and a capacitance element Cf2 are subjected to DC resonance in a 5-GHz band, and that an inductance element Lf3 and a capacitance element Cf4 are subjected to resonance in a 2.4-GHz band. This divides or separates signals in 2.4-GHz and 5-GHz bands to P3 and P4. The same circuit may be used for the diplexer circuit 13.

Figure 7:
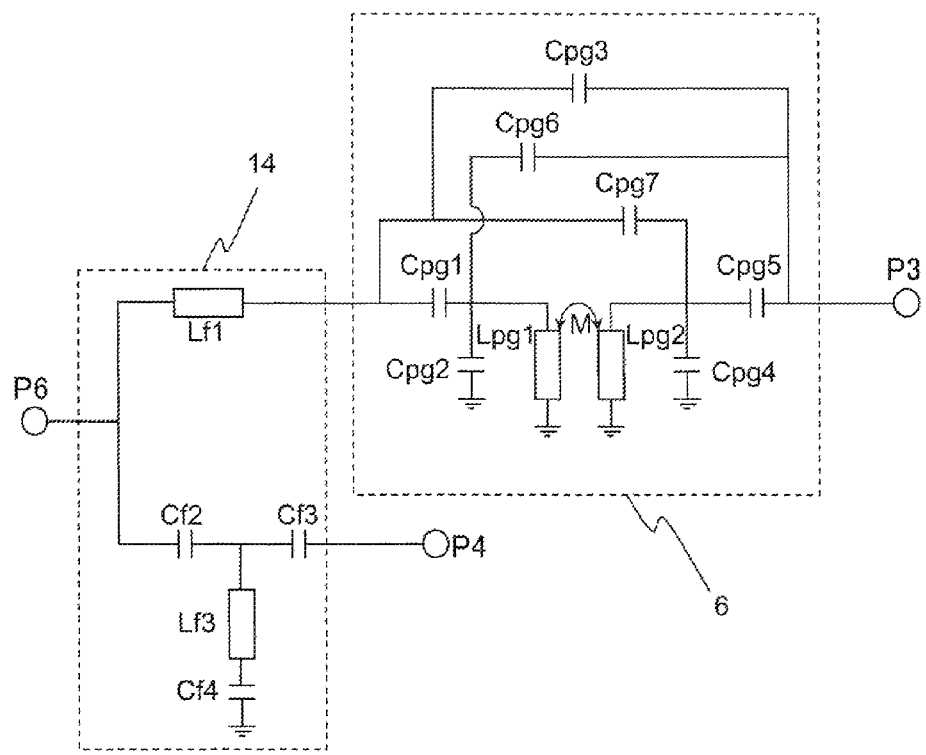
FIG. 7 is a view showing another example of equivalent circuits of diplexer circuits in the high-frequency circuit of the present invention.

FIG. 7 shows another example of the diplexer circuit. Although a lowpass filter in the diplexer circuit 14 is constituted by only a transmitting line Lf1 in the example shown in FIG. 7, the structure of the diplexer circuit 14 may be determined depending on the circuit structure of a bandpass filter 6 connected thereto. For instance, by adjusting the length of the transmitting line Lf1 such that impedance is substantially open in a 5-GHz band when P3 is viewed from a common terminal P6 of the diplexer circuit 14, the diplexer circuit 14 can function like a lowpass filter. This enables the insertion loss reduction, miniaturization and cost reduction of the diplexer circuit 14. The diplexer circuit 13 may also have the same circuit structure.

Figure 8:
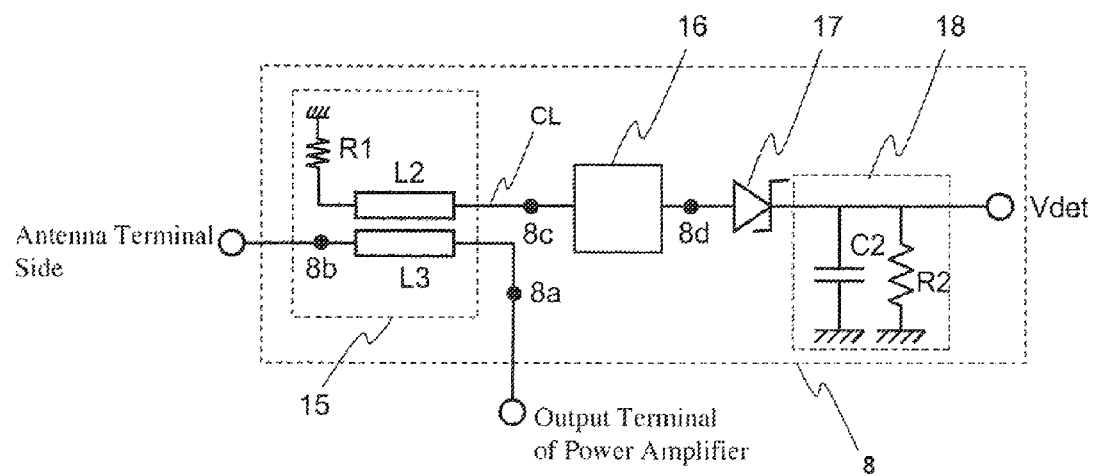
FIG. 8 is a view showing a further example of equivalent circuits of detection circuit in the high-frequency circuit of the present invention.

FIG. 8 shows one example of the detection circuit. The detection circuit 8 comprises as main components a coupling circuit 15 connected to an output terminal of a power amplifier circuit, a detection diode 17, and a smoothing circuit 18 comprising a capacitance $C_2$ and a resistor $R_2$, to monitor the output power of the first and second power amplifier circuits, and output it to a voltage detection terminal Vdet. Although the coupling circuit 15 and the detection diode 17 may be contained in a power amplifier MMIC, the coupling circuit 15 is preferably disposed near the antenna terminal. Though the coupling circuit 15 may be capacitance coupling, it is desirably a directional coupling circuit, which can reduce the variation of detected voltage when the output-matching conditions (mainly antenna impedance) of a power amplifier change, and can reduce the influence of reflected waves on the antenna, thereby achieving higher-precision monitoring of the output power.

Figure 11:
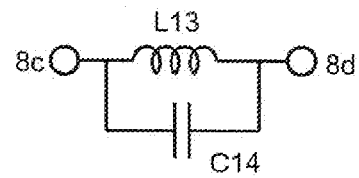
FIG. 11 is a view showing equivalent circuits of notch filter circuits in the high-frequency circuit of the present invention.
Figure 11:
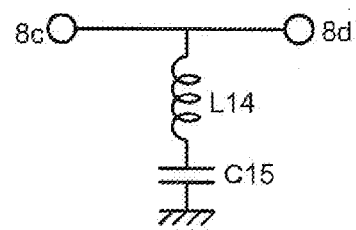
Figure 12:
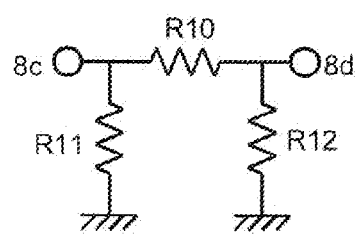
FIG. 12 is a view showing equivalent circuits of attenuator circuits in the high-frequency circuit of the present invention.
Figure 12:
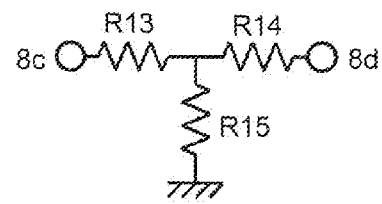

A circuit 16 for reducing harmonic distortion generated by the detection diode 17 is preferably disposed between the coupling circuit 15 and the detection diode 17. The harmonics-reducing circuit 16 is preferably either of lowpass filters shown in (a) to (c) in FIG. 10, notch filters shown in (a) and (b) in FIG. 11, attenuators shown in (a) and (b) in FIG. 12, etc. Because the harmonics-reducing circuit 16 is connected between the coupling circuit 15 and the detection diode 17, main paths through which transmitting/received signals pass, suffer from substantially no communications loss, resulting in high-quality communications and low power consumption.

Figure 9:
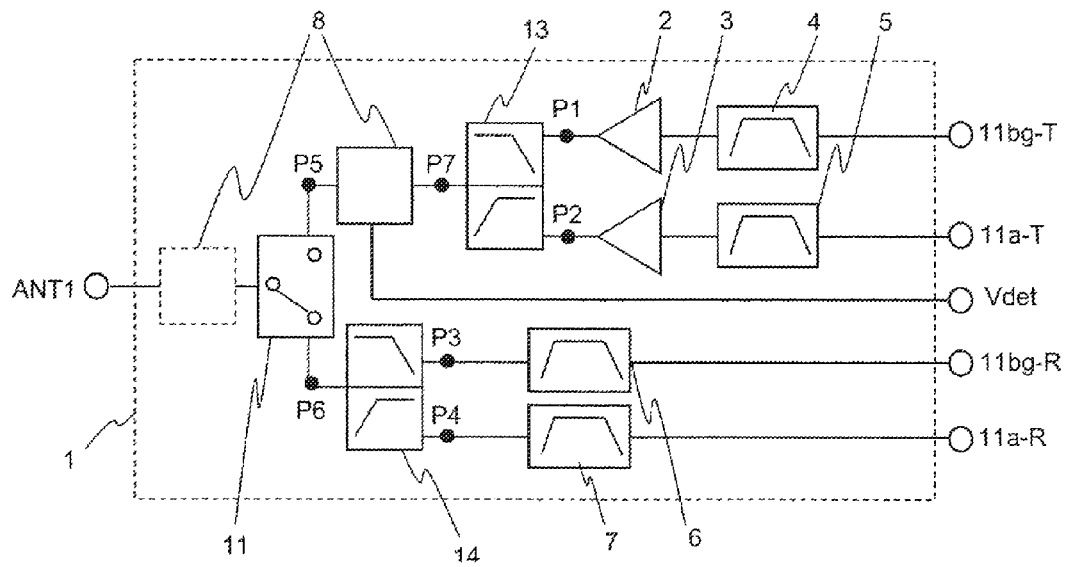
FIG. 9 is a block diagram showing the high-frequency circuit according to another embodiment of the present invention.

As shown in FIG. 9, the detection circuit 8 is preferably disposed between the common terminal P7 of the diplexer circuit 13 and the output terminal P5 of the high-frequency switch 11 or between the antenna terminal ANT1 and the high-frequency switch 11 as shown by the dotted line. The arrangement of the detection circuit 8 shown in FIG. 9 makes it unnecessary to connect a coupling circuit, a detection diode, a voltage detection terminal, etc. to each of the first and second power amplifier circuits 2, 3, thereby achieving miniaturization and cost reduction.

Figure 13:
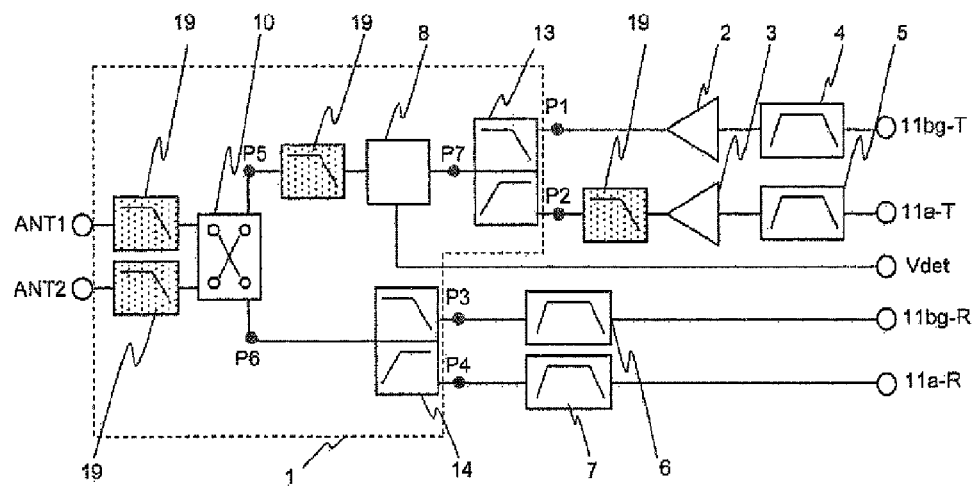
FIG. 13 is a block diagram showing the high-frequency circuit according to a further embodiment of the present invention.

A lowpass filter circuit is preferably disposed between the power amplifier circuit 2, 3 and the antenna. When a lowpass filter circuit 19 is disposed, for instance, between the power amplifier circuit 3 and the diplexer circuit 13, between the high-frequency switch circuit 10 and the detection circuit 8, or between the antenna terminals ANT1, ANT2 and the high-frequency switch circuit 10 as shown in FIG. 13, harmonic distortion generated by the power amplifier circuits 2, 3 or the detection circuit 8 is reduced, so that harmonics irradiated from the antenna terminal is lowered to a practically acceptable level. In FIG. 13, the lowpass filter circuit 19 is emphasized by a dot pattern, and shown at all possible positions for convenience. Of course, the lowpass filter circuit 19 need not be disposed at all depicted positions but may be disposed at least one position.

Figure 10:
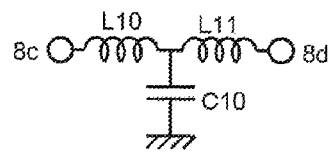
FIG. 10 is a view showing equivalent circuits of lowpass filter circuits in the high-frequency circuit of the present invention.
Figure 10:
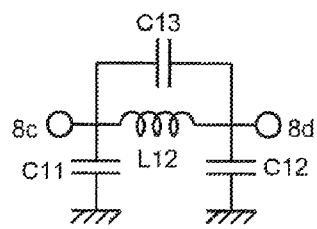
Figure 10:
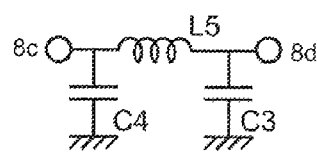

When the diplexer circuit 13 functions as a lowpass filter circuit, the lowpass filter circuit need not be disposed between the power amplifier circuit 2 and the diplexer circuit 13. FIG. 10 shows one example of equivalent circuits of lowpass filter circuits 19. To reduce harmonic distortion at a particular frequency, a notch filter circuit shown in FIG. 11 may be used in place of the lowpass filter circuit.

Figure 14:
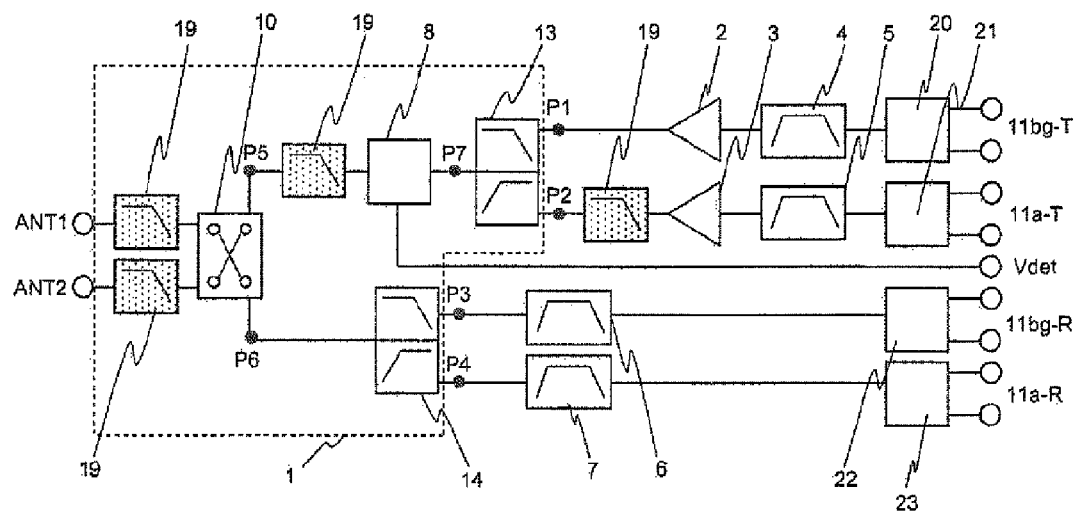
FIG. 14 is a block diagram showing the high-frequency circuit according to a still further embodiment of the present invention.
Figure 15:
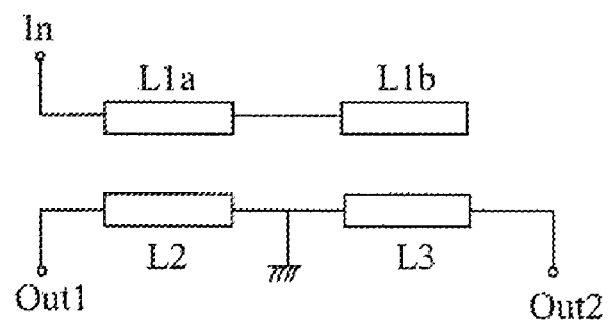
FIG. 15 is a view showing one example of equivalent circuits of balanced-unbalanced circuits used in the high-frequency circuit of the present invention.

As shown in FIG. 14, a balanced-unbalanced circuit 20, 21, 22 or 23 may be connected to the first transmitting-signal input terminals 11bg-T, the second transmitting-signal input terminals 11a-T, the first received-signal output terminals 11bg-R, or the second received-signal output terminals 11a-R. Each balanced-unbalanced conversion circuit 20, 21, 22 or 23 may have an impedance-converting function constituted by one or more inductance elements and one or more capacitance elements. The bandpass filter circuit and the balanced-unbalanced conversion circuit may be constituted by an unbalanced-input-balanced-output-type SAW filter. FIG. 15 exemplifies an equivalent circuit of the balanced-unbalanced circuit 20, 21, 22 or 23. The balanced-unbalanced circuit comprises inductance elements L1a, L1b, L2, L3. Although the balanced-unbalanced circuits 20-23 are shown at all possible positions in FIG. 14 for explanation, at least one balanced-unbalanced circuit is enough. Although the lowpass filter circuit 19 is also shown at all possible positions as in FIG. 13, at least one is enough.

Figure 16:
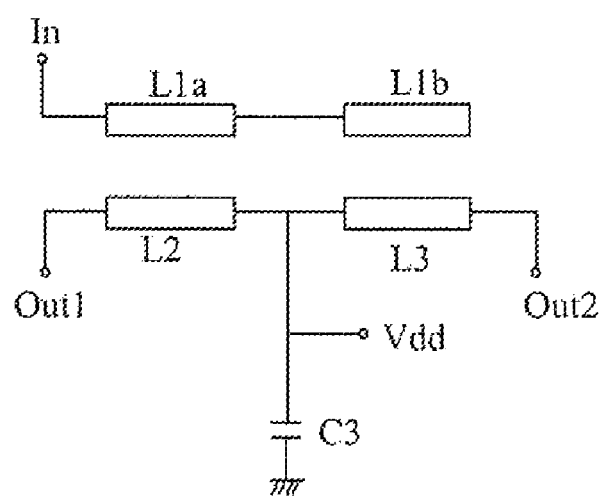
FIG. 16 is a view showing another example of equivalent circuits of balanced-unbalanced circuits used in the high-frequency circuit of the present invention.

FIG. 16 shows an equivalent circuit of a preferred example of the balanced-unbalanced circuit 20, 21, 22 or 23 shown in FIG. 15. The circuit of FIG. 16 comprises, in addition to the circuit elements shown in FIG. 15, a DC feed terminal Vdd between an inductance element L2 and an inductance element L3. A capacitor C3 is connected between the DC feed terminal Vdd and the ground. The capacitor C3 can adjust the phase difference of high-frequency signals input to the balanced terminals Out1, Out2. An unbalanced terminal In is connected to the input of bandpass filter circuits 6, 7 or a power amplifier circuit, and the balanced terminals Out1, Out2 are connected to the transmitting output of RFIC.

When DC voltage is applied from the DC feed terminal Vdd, substantially the same level of current flows through the inductance elements L2 and L3 in an opposite direction, so that substantially the same level of current is output from each balanced terminal Out1, Out2. Because substantially the same DC voltage is applied to two balanced transmitting output terminals of RFIC when DC voltage is applied from the DC feed terminal Vdd, it is unnecessary to have an additional choke coil. This balanced-unbalanced circuit makes unnecessary pluralities of discrete parts that are conventionally necessary for voltage supply, achieving the miniaturization and weight reduction of the high-frequency circuit.

Figure 17:
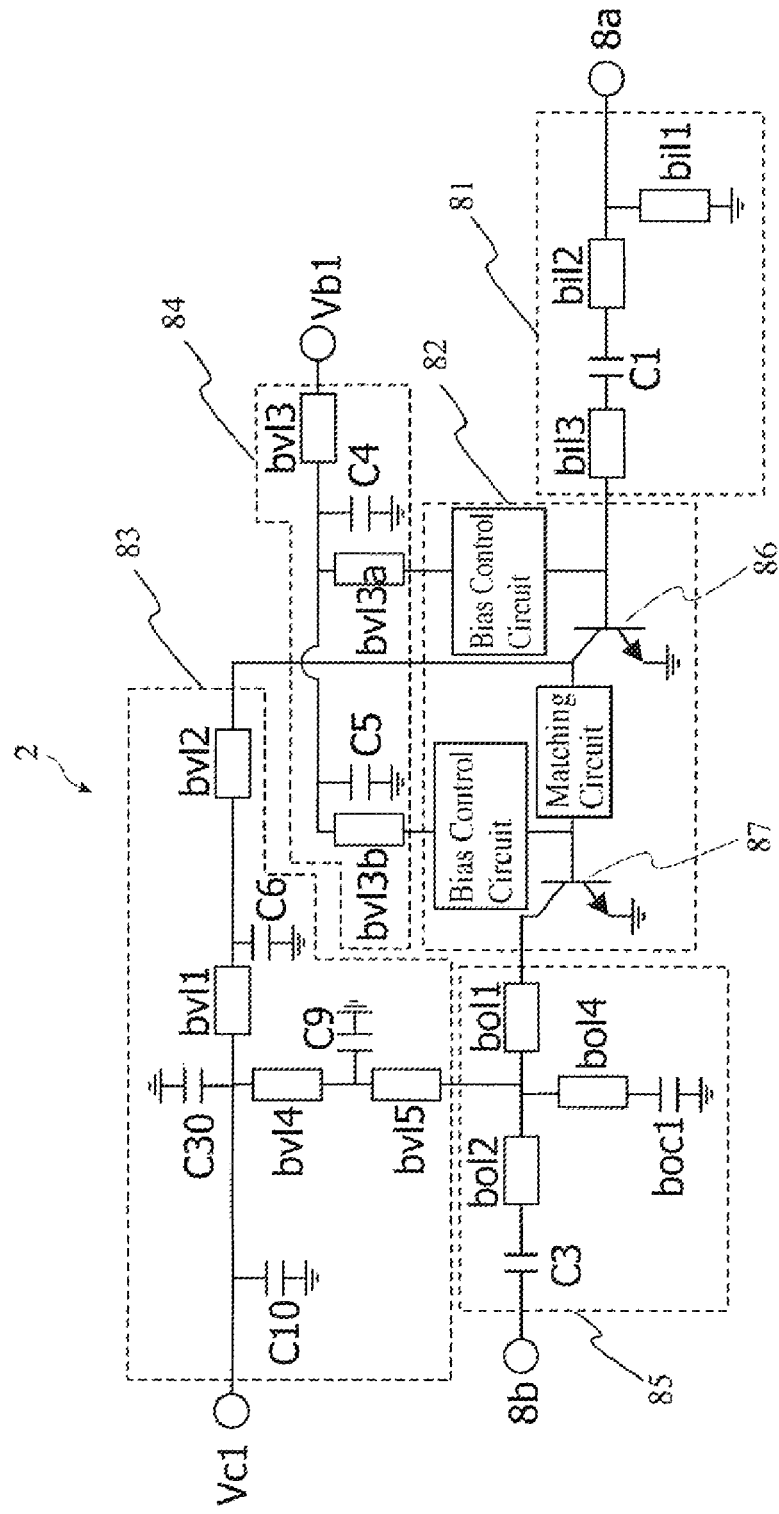
FIG. 17 is a view showing one example of equivalent circuits of power amplifier circuits used in the high-frequency circuit of the present invention.

FIG. 17 shows one example of equivalent circuits of the first power amplifier circuit 2 of FIG. 14. The power amplifier circuit 2 is constituted by an input matching circuit 81, an output matching circuit 85, a collector power supply circuit 83, a base power supply circuit 84, and a semiconductor MMIC chip 82 integrally comprising transistor circuits 86,

87, a matching circuit and bias control circuits. The input terminal 8a is connected to the bandpass filter 4, and the output terminal 8b is connected to the port P1 of the diplexer circuit 13. Voltage supplied from a terminal Vc1 is applied to a collector of each transistor via choke coils bvl1, bvl2, bvl4, bvl5 and noise-cutting capacitors C10, C30, C6, C9. Voltage supplied from a terminal Vb1 is applied to the bias control circuits via transmitting lines bvl3, bvl3a, bvl3b and noise-cutting capacitors C4, C5. Voltage converted by the bias control circuits is applied to a base of each transistor, and a high-frequency signal input through the input terminal 8a is amplified and output from the output terminal 8b.

Figure 18:
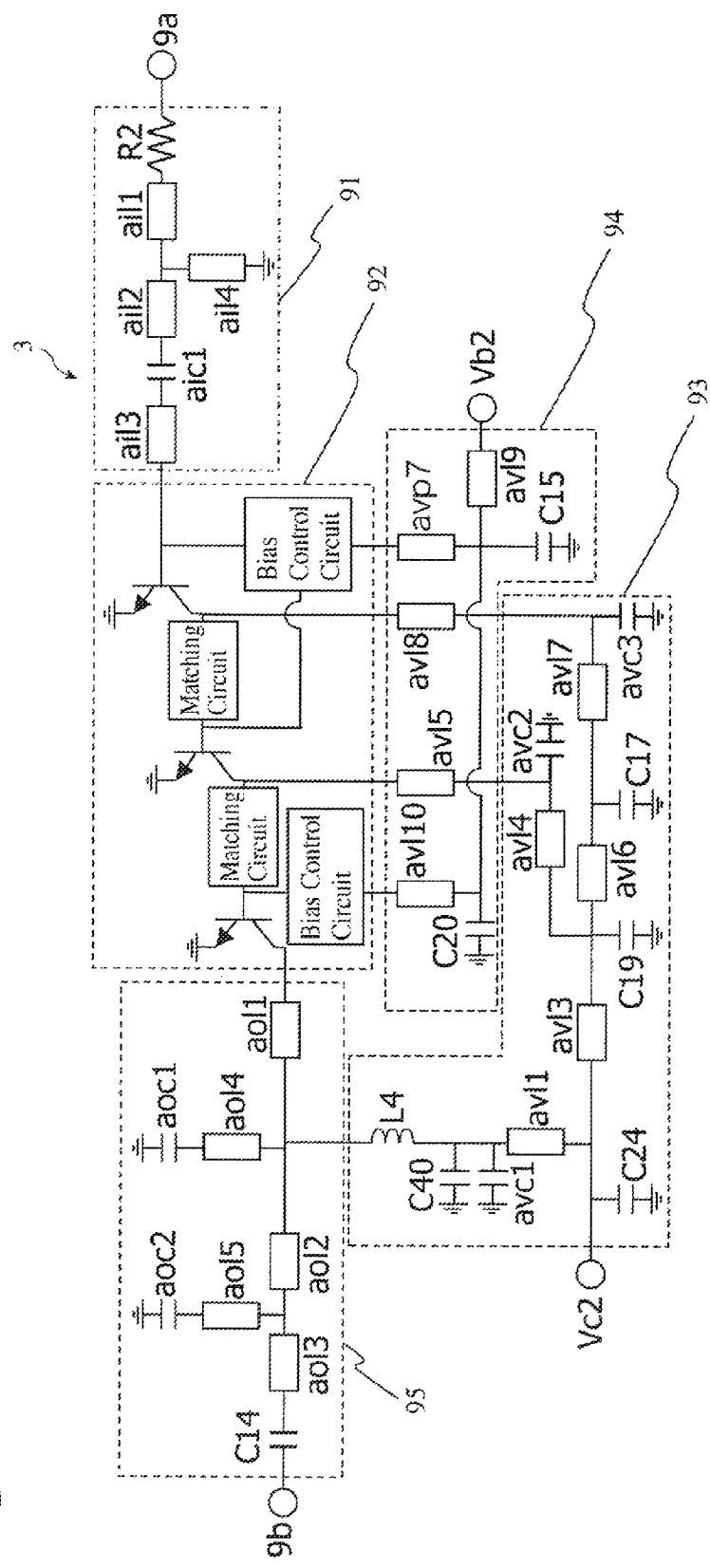
FIG. 18 is a view showing one example of equivalent circuits of power amplifier circuits used in the high-frequency circuit of the present invention.

FIG. 18 shows one example of equivalent circuits of the second power amplifier circuit 3 of FIG. 14. The power amplifier circuit 3 is constituted by an input matching circuit 91, an output matching circuit 95, a collector power supply circuit 93, a base power supply circuit 94, and a semiconductor MMIC chip 92 integrally comprising transistor circuits, matching circuits and bias control circuits. The input terminal 9a is connected to the bandpass filter 5, and the output terminal 8b is connected to the port P2 of the diplexer circuit 13. Voltage supplied from a terminal Vc2 is applied to a collector of each transistor via choke coils L4, avl1, avl3, avl4, avl5, avl7, avl8, and noise-cutting capacitors C24, C40, C19, C17, avc1, avc2, avc3. Voltage supplied from a terminal Vb2 is applied to bias control circuits via transmitting lines avp7, avl9, avl10, and noise-cutting capacitors C15, C20. Voltage converted by the bias control circuits is applied to a base of each transistor, and a high-frequency signal input through the input terminal 9a is amplified and output from the output terminal 9b.

Figure 19:
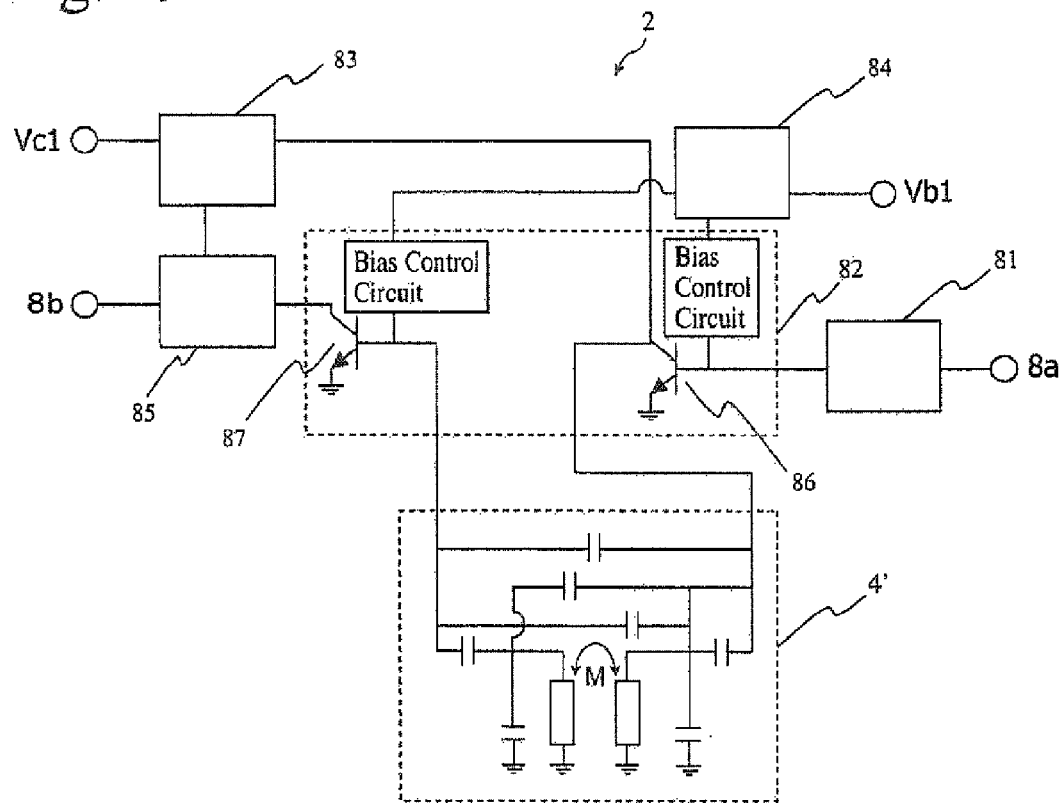
FIG. 19 is a view showing one example of equivalent circuits of power amplifier circuits used in the high-frequency circuit of the present invention.

FIG. 19 shows another example of equivalent circuits of the first power amplifier circuit 2 of FIG. 14. In this equivalent circuit, unlike FIG. 17, a bandpass filter 4' is disposed between the collector of the transistor 86 and the base of the transistor 87. The bandpass filter 4' drastically reduces noises induced by thermal noises. In general, noise input from RFIC and noise induced by the thermal noises of the power amplifier circuit itself are contained in the output signal of the power amplifier circuit 2. Although the former noise can be reduced by connecting the bandpass filter 4 to the input side of the power amplifier circuit 2, the latter noise cannot be removed by the bandpass filter on the input side. Although the noise due to thermal noises can be removed by connecting the bandpass filter on the output side, insertion loss increases in the output stage. Thus, as shown in FIG. 19, noise due to thermal noises can be drastically reduced by a bandpass filter 4' disposed between a base of a last-stage transistor and an emitter of its penultimate-stage transistor, with substantially no loss in the output stage. The bandpass filter 4' shown in FIG. 19 comprises as a main component two or more transmitting line resonators each having one end grounded, and may have a surface acoustic wave filter, an FBAR filter, etc.

Figure 20:
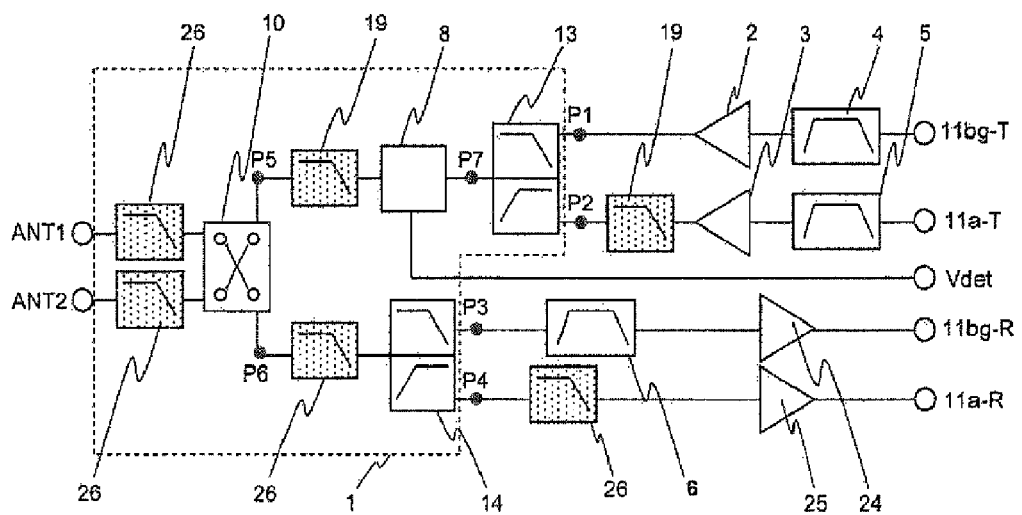
FIG. 20 is a block diagram showing the high-frequency circuit according to a still further embodiment of the present invention.

In another embodiment of the present invention, as shown in FIG. 20, low-noise amplifier circuits 24, 25 are connected to the first receiving terminal 11bg-R or the second receiving terminal 11a-R. The low-noise amplifiers 24, 25 have a function to amplify a received weak signal detected by the antenna and improve the receiving sensitivity. Although a low-noise amplifier with small noise index is generally used to improve the receiving sensitivity, reducing loss on the input side of the low-noise amplifier is also effective. The integration of a low-noise amplifier circuit with the high-frequency circuit minimizes lines on the input side of the low-noise amplifier, making it possible to improve the receiving sensitivity more than when the low-noise amplifier is disposed outside the high-frequency circuit. Like FIG. 13, FIG. 20 shows an addable lowpass filter circuit 19 at all possible positions with emphasis by a dot pattern, but at least one lowpass filter circuit is, of course, enough.

A lowpass filter circuit 26 is preferably disposed between the low-noise amplifier circuits 24, 25 and the antenna terminals ANT1, ANT2. The lowpass filter circuit 26 has a function to reduce harmonic distortion generated by the low-noise amplifier circuits 24, 25. Specifically, part of a large power signal output from the first or second power amplifier circuit 2, 3 during the transmitting operation is input to the low-noise amplifiers 24, 25 via a high-frequency switch circuit 10, and harmonics generated from the low-noise amplifiers 24, 25 in off-operation are emitted from the antennas as reflected waves. To solve this problem, it is effective to dispose lowpass filter circuits 26 between the low-noise amplifier circuits 24, 25 and the antenna terminals ANT1, ANT2. FIG. 20 shows the addable lowpass filter circuits 26 at all possible positions with emphasis by a dot pattern, but at least one lowpass filter circuit is, of course, enough. To reduce harmonic distortion at a particular frequency, the notch filter circuit, the bandpass filter circuit, etc. shown in FIG. 11 may be used in place of the lowpass filter circuit.

FIGS. 21-24 show examples of equivalent circuits of the high-frequency switch circuit (DPDT1) 10. These high-frequency switch circuits comprise as main components switching elements such as field effect transistors FETs, diodes, etc., and may further comprise inductance elements and capacitance elements.

Figure 21:
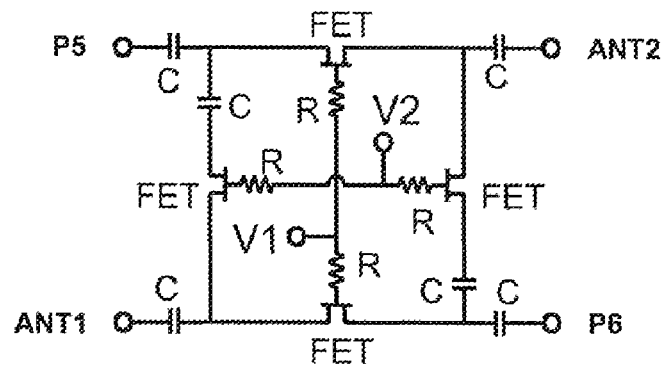
FIG. 21 is a view showing one example of equivalent circuits of DPDT switches used in the high-frequency circuit of the present invention.
Figure 22:
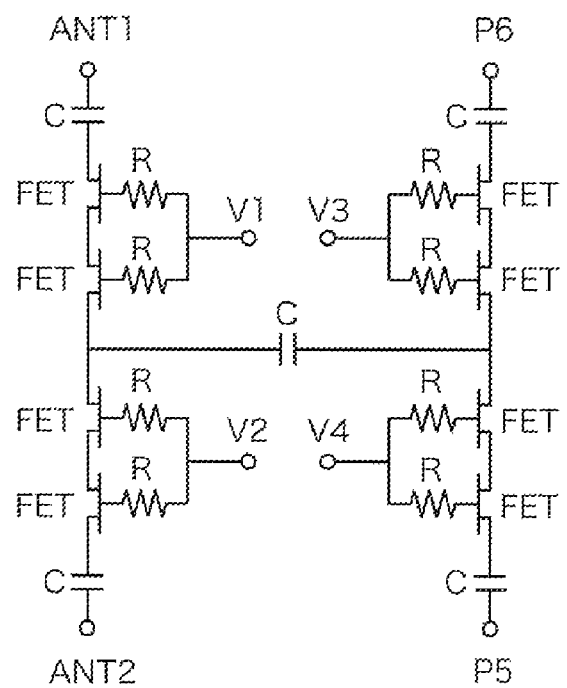
FIG. 22 is a view showing another example of equivalent circuits of DPDT switches used in the high-frequency circuit of the present invention.
Figure 23:
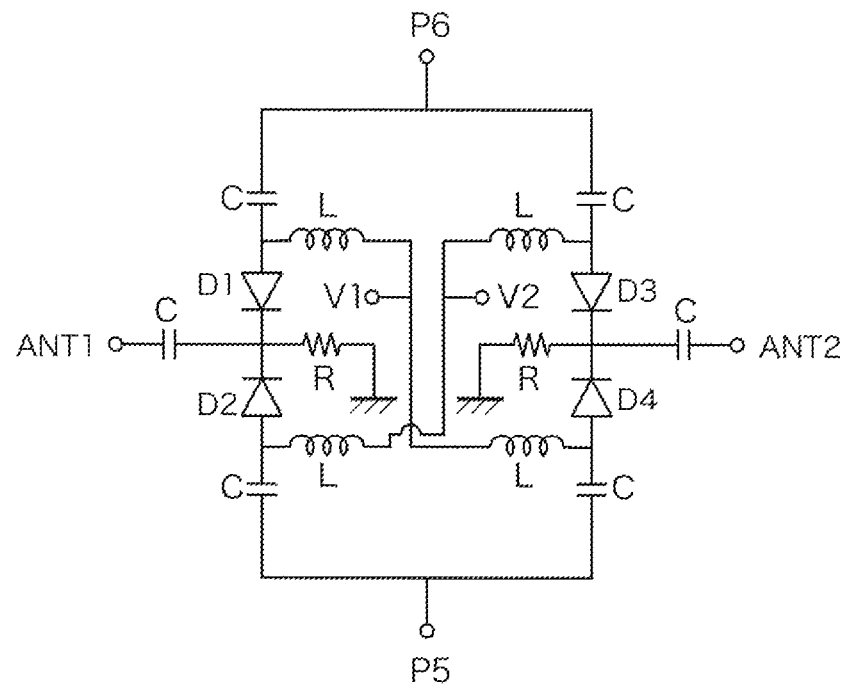
FIG. 23 is a view showing a further example of equivalent circuits of DPDT switches used in the high-frequency circuit of the present invention.
Figure 24:
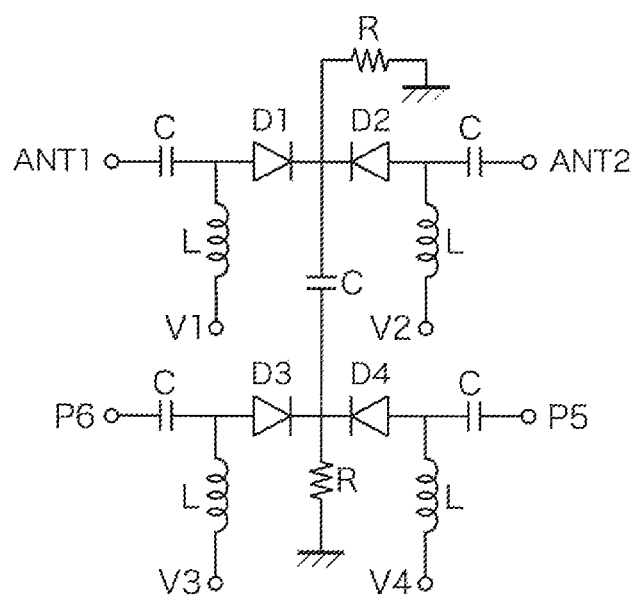
FIG. 24 is a view showing a further example of equivalent circuits of DPDT switches used in the high-frequency circuit of the present invention.

When the switch circuit of FIG. 21 is used in the DPDT switch circuit 10 of FIG. 2, a diversity receiving operation is as follows. In this switch circuit 10, voltage controlled by the switch-circuit-controlling means is applied to the control terminals V1, V2, to perform connection and disconnection between the ports as shown in Table 1.

TABLE 1

| Connection Mode | VC1 | VC2 | Between ANT1 and P6 | Between ANT1 and P5 | Between ANT2 and P6 | Between ANT2 and P5 |
|---|---|---|---|---|---|---|
| 1 | High | Low | Connected | Disconnected | Disconnected | Connected |
| 2 | Low | High | Disconnected | Connected | Connected | Disconnected |

When diversity receiving is conducted, frequency scanning is conducted before starting communications, to detect receivable frequency channels. In the scanning operation, the high-frequency switch circuit 10 is controlled by the switch-circuit-controlling means, to obtain, for instance, the connection mode 1 shown in Table 1. In this case, the first multi-band antenna ANT1 is connected to the diplexer circuit 14 on the receiving circuit side, so that the receiving circuits of two communications systems are connected to one multi-band antenna. Then, the receiving circuit part of IEEE802.11a is scanned in a 5-GHz band, and the transmitting/receiving part of 802.11b is scanned in a 2.4-GHz band, to detect all receivable channels.

The high-frequency switch circuit 10 is then controlled to the connection mode 2 by the switch-circuit-controlling means. In this case, the second multi-band antenna ANT2 is connected to the diplexer circuit 14 on the receiving circuit side. The receiving circuit part of IEEE802.11a is then scanned in a 5-GHz band, and the transmitting/receiving part of 802.11b is scanned in a 2.4-GHz band, to detect all receivable channels.

Based on the frequency scanning result, the amplitudes of signals received by the first and second dual-band antennas ANT1, ANT2 are compared to select a communications system to be activated, and an antenna to be connected to the transmitting/receiving circuit of that communications system. According to the present invention, diversity receiving can be conducted by selecting the optimum communications system, even if there is disturbance such as phasing, etc.

Apart from the above method, diversity receiving can also be conducted by connecting the second multi-band antenna ANT2 to the diplexer circuit 14 on the receiving circuit side, scanning signals in both 5-GHz and 2.4-GHz bands to detect all receivable channels, conducting the comparison of the amplitudes of the signals to select one communications system, activating its transmitting/receiving circuit part, changing a multi-band antenna connected to the activated transmitting/receiving circuit part to the first multi-band antenna ANT1, receiving signals without changing the receiving channel, comparing the signals received by the two antennas, and selecting an antenna with which better receiving can be performed as an antenna to be activated.

Figure 25:
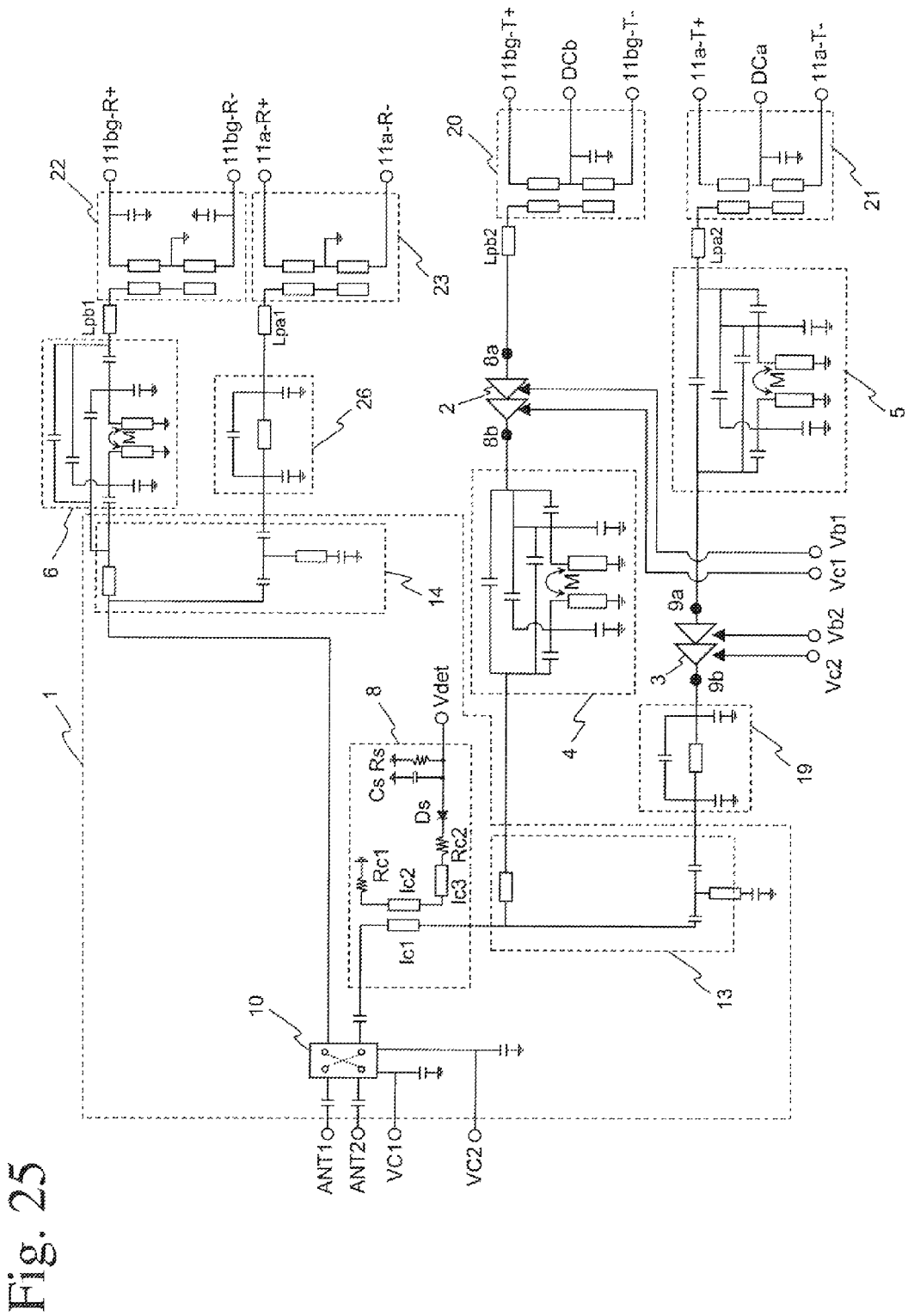
FIG. 25 is a view showing an equivalent circuit of the high-frequency circuit according to a still further embodiment of the present invention.

FIG. 25 shows the high-frequency circuit according to one embodiment of the present invention. This circuit comprises a high-frequency switch 10, a bandpass filter circuit 4 connected to the output of a 2.4-GHz-band power amplifier circuit 2, a bandpass filter circuit 5 and a lowpass filter circuit 19 respectively connected to the input and output of a 5-GHz-band power amplifier circuit 3, a bandpass filter circuit 6 and a receiving-side diplexer circuit 14 both connected to a 2.4-GHz-band receiving path, a lowpass filter circuit 26 connected to a 5-GHz-band receiving path, a detection circuit 8 connected between a transmitting-side diplexer circuit 13 and the high-frequency switch 10, and balanced-unbalanced conversion circuits 20, 21, 22, 23 respectively connected to 2.4-GHz-band transmitting-signal input terminals 11bg-T, 5-GHz-band transmitting-signal input terminals 11a-T, 2.4-GHz-band received-signal output terminals 11bg-R, and 5-GHz-band received-signal output terminals 11a-R. The detection circuit 8 comprises a directional coupling circuit constituted by transmitting lines 1c1 and 1c2, a matching-controlling transmitting line 1c3 disposed between the transmitting line 1c2 and a detection diode Ds, and a resistor Rc2 functioning as an attenuator. Transmission lines Lpb1, Lpb2, Lpa1, Lpa2 connected to the unbalanced inputs of the balanced-unbalanced conversion circuits 20-23 provide matching with the bandpass filter circuits 5, 6, the power amplifier circuit 2 and the lowpass filter circuit 26, thereby reducing the insertion loss of a passband. DC voltage can be simultaneously applied from the DC feed terminals DCa, DCb of the balanced-unbalanced conversion circuits 20, 21 on the transmitting-signal input side, to an 11bg-T+ terminal and an 11bg-T− terminal, or an 11a-T+ terminal and an 11a-T− terminal.

Figure 26:
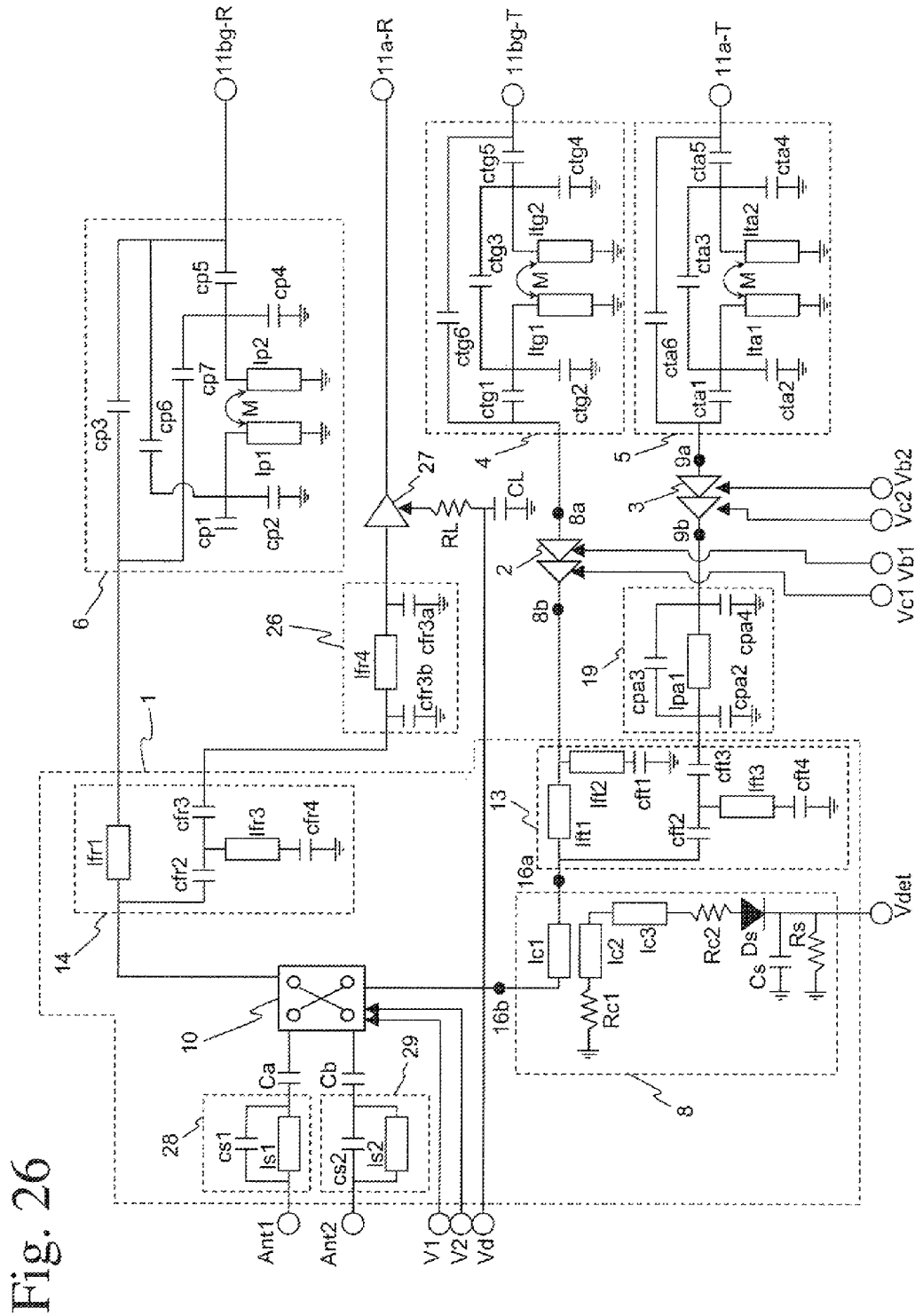
FIG. 26 is a view showing an equivalent circuit of the high-frequency circuit according to a still further embodiment of the present invention.

FIG. 26 shows the high-frequency circuit according to another embodiment of the present invention. It differs from the high-frequency circuit shown in FIG. 25, in (1) that a 5-GHz-band, low-noise amplifier circuit 27 is connected between a 5-GHz-band-received-signal output terminal 11a-R and a lowpass filter circuit 26, (2) that a notch circuit 28 comprising an inductance element $1s1$ and a capacitance element cs1 and a notch circuit 29 comprising an inductance element $1s2$ and a capacitance element cs2 are connected between the antenna terminals ANT1 and ANT2 and the high-frequency switch circuit 10, (3) that the bandpass filter circuit 4 is connected to the input of the 2.4-GHz-band power amplifier circuit 2, and (4) that the balanced-unbalanced conversion circuits 20, 21, 22, 23 are omitted. With this circuit structure, a weak received signal detected by the antennas is amplified by the low-noise amplifier circuit 27 to increase the receiving sensitivity. To reduce harmonic distortion generated by the amplifier circuits, the detection circuit, the low-noise amplifiers, etc., notch filter circuits 28, 29 are used.

Figure 27:
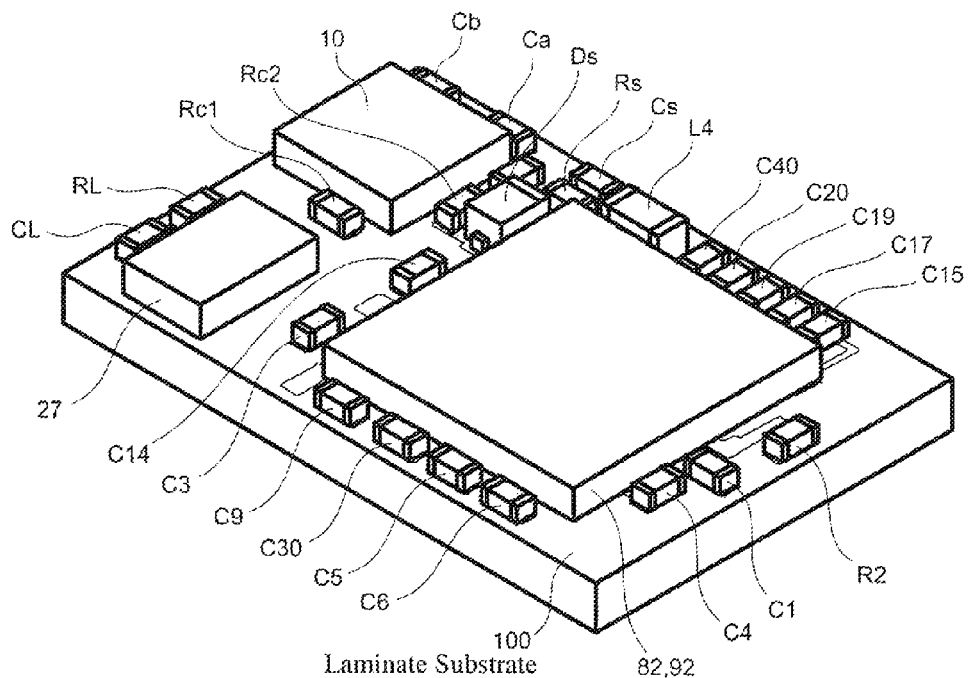
FIG. 27 is a perspective view showing the appearance of the high-frequency component according to one embodiment of the present invention.
Figure 28:
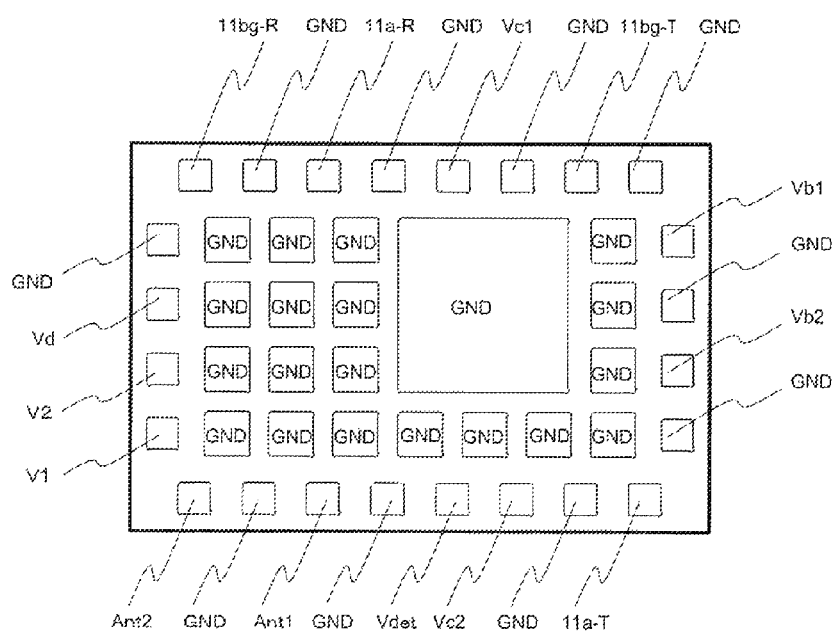
FIG. 28 is a bottom view showing a laminate substrate constituting the high-frequency component according to one embodiment of the present invention.
Figure 29:
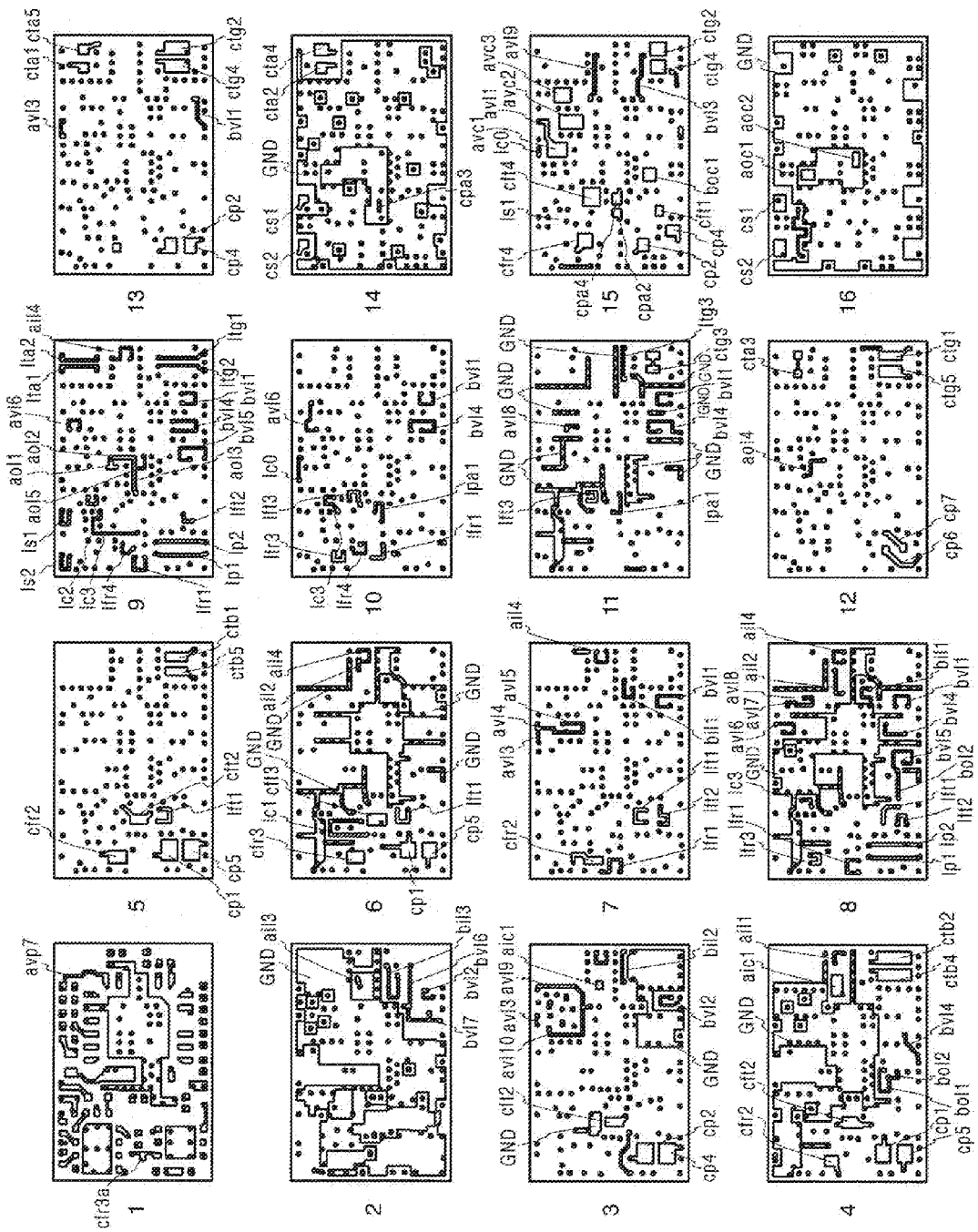
FIG. 29 is a view showing laminate patterns in the laminate substrate constituting the high-frequency component according to one embodiment of the present invention.

FIG. 27 shows the appearance of the multi-band, high-frequency component of the present invention structured as a laminate substrate 100, FIG. 28 shows a bottom surface of the laminate substrate 100, and FIG. 29 shows electrodes on each layer in the laminate substrate 100 having the equivalent circuit shown in FIG. 26. This high-frequency component comprises a high-frequency switch circuit 10, a transmitting-side diplexer circuit 13, a receiving-side diplexer circuit 14, lowpass filter circuits 19, 26, power amplifier circuits 2, 3, bandpass filter circuits 4, 5, 6, a low-noise amplifier circuit 27, and a detection circuit 8.

The laminate substrate 100 can be produced by printing conductive paste of low-resistivity Ag, Cu, etc. on each green sheet having a thickness of 10-200 μm and made of dielectric ceramics sinterable at, for instance, as low temperatures as 1000° C. or lower, such as LTCC (low-temperature-cofired ceramics), to form electrode patterns, integrally laminating pluralities of green sheets having electrode patterns, and sintering the resultant laminate.

The preferable dielectric ceramics are, for instance, materials comprising Al, Si and Sr as main component, and Ti, Bi, Cu, Mn, Na and K as sub-components; materials comprising Al, Si and Sr as main component, and Ca, Pb, Na and K as sub-components; materials comprising Al, Mg, Si and Gd; and materials comprising Al, Si, Zr and Mg. The dielectric ceramics have a dielectric constant of about 5-15. Other than the dielectric ceramics, resins, and mixtures of resins and dielectric ceramic powder may be used. Transmission lines, etc. of high-temperature-sinterable metals such as tungsten, molybdenum, etc. may be formed on $Al_2O_3$-based dielectric ceramic green sheets by an HTCC (high-temperature cofirable ceramic) technique.

As shown in FIG. 29, the laminate substrate 100 is constituted by 16 layers of sheets. The uppermost sheet 1 is provided on the upper surface with pluralities of land electrodes for mounting chip parts that are not contained in the laminate substrate 100. As shown in FIG. 27, mounted on the land electrodes are a high-frequency switch circuit 10, the low-noise amplifier 27, the MMIC circuit 82 containing the power-amplifying circuits and the bias control circuits in the first power amplifier circuit 2, the MMIC circuit 92 containing the power-amplifying circuits and the bias control circuits in the second power amplifier circuit 3, a Schottky diode Ds constituting part of the detection circuit 8, chip resistors Rs, Rc1, Rc2, a chip capacitor Cs, chip capacitors C1, C3, C4, C5, C6, C9, C30 constituting the circuit of the first high-frequency power amplifier 8, chip capacitors C14, C15, C17, C19, C20, C40, a chip inductor L4 and a chip resistor $R_2$ constituting the circuit of the second high-frequency power amplifier 9, DC-cutting capacitors Ca, Cb in the switch circuit, a chip resistor RL connected to the power supply of the low-noise amplifier, and a capacitor CL. The transmitting line avp7 on the sheet 1 is disposed between the power-amplifying circuit 92 in the second high-frequency power amplifier 9 and the ground. The land electrodes are connected through via-holes to connecting lines and circuit elements formed in the laminate substrate 100.

FIG. 29 shows an electrode pattern structure in the laminate substrate 100. Line electrodes, capacitor electrodes and ground electrodes connected through via-holes (shown by black circles in the figure) are formed on the green sheets 2-16. The lowermost green sheet 16 is provided with a ground electrode GND on an upper surface, and terminal electrodes for mounting the laminate substrate on a circuit board as shown in FIG. 28 on a rear surface. Thermal-vias are formed in regions on which the chips 82, 92 of the power amplifier circuit MMIC are mounted, to increase heat radiation properties from the upper surface to the rear surface. To suppress unnecessary noise radiation, the sheets 2, 4, 14 and 16 are provided with wide ground electrodes GND.

Because the same reference numerals as in FIGS. 17, 18 and 26 are assigned to the transmitting lines and capacitor electrode patterns formed on the sheets, their detailed explanation will be omitted. The circuits three-dimensionally constituted by electrode patterns in the laminate substrate 100 are separated by ground electrodes GND and via-holes connected thereto, or disposed such that they do not overlap in the laminate direction, to prevent their electromagnetic interference.

Figure 30:
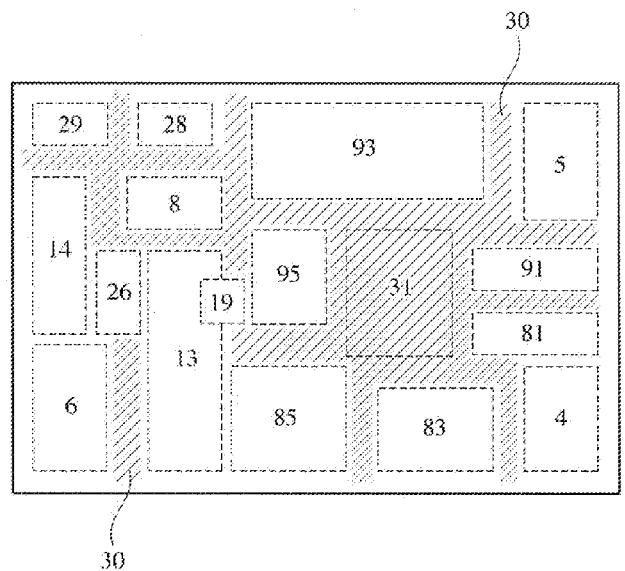
FIG. 30 is a schematic view showing patterns in laminate substrates constituting the high-frequency component according to one embodiment of the present invention.

FIG. 30 schematically shows the planar arrangement of function blocks. The bandpass filter circuits 4, 5, 6 are disposed in corner areas of the laminate substrate 100, in which there is the smallest interference with other circuit blocks. Because insufficient isolation among the input-matching circuits 81, 91 of the power amplifier circuits, the collector power supply circuits 83, 93, and the output-matching circuits 85, 95 is likely to cause the malfunction and oscillation of the high-frequency power amplifier, ground electrodes, through-hole electrodes, etc. are three-dimensionally arranged to constitute shields 30 (shown by hatching) for secure isolation among these circuit blocks. Also properly disposed are planar ground electrodes GND on the sheets 2, 4, 6, 8, 14, 16 as shown in FIG. 29, and via-holes connected to the ground electrodes GND.

As shown in FIG. 28, the laminate substrate 100 is provided on the rear surface with a large ground electrode GND, and small ground electrodes GND surrounding it. Provided on four sides of the rear surface of the laminate substrate 100 are the antenna ports ANT1, ANT2, the transmitting and receiving ports 11bg-T, 11bg-R for a 2.4-GHz-band wireless LAN, the transmitting and receiving ports 11a-T, 11a-R for a 5-GHz-band wireless LAN, the ground port GND, the control ports V1, V2 for the first and second high-frequency switch circuits, the power supply ports Vc1, Vb1, Vc2, Vb2 for the power amplifier circuits, the power supply port Vd for the low-noise amplifier, and the voltage output port Vdet of the detection circuit. The reference numeral for each terminal electrode in FIG. 28 is the same as in FIG. 26. Although the terminal electrodes are arranged in LGA (land grid array) in the depicted example, they may be arranged in BGA (ball grid array).

The switch circuit 10, the power amplifier circuits 82, 92, and the low-noise amplifier 27 may be mounted on the land electrodes of the laminate substrate in a bare state, and sealed with resins or pipes. Thus, the bandpass filter circuits, the diplexer circuits, the lowpass filters, the detection circuit, and the input- and output-matching circuits and power supply circuits, etc. can be integrated with the laminate substrate to miniaturize the high-frequency circuit module. Of course, the RFIC and the base band IC constituting the transmitting/receiving circuit parts may also be integrated with the laminate substrate.

Figure 31:
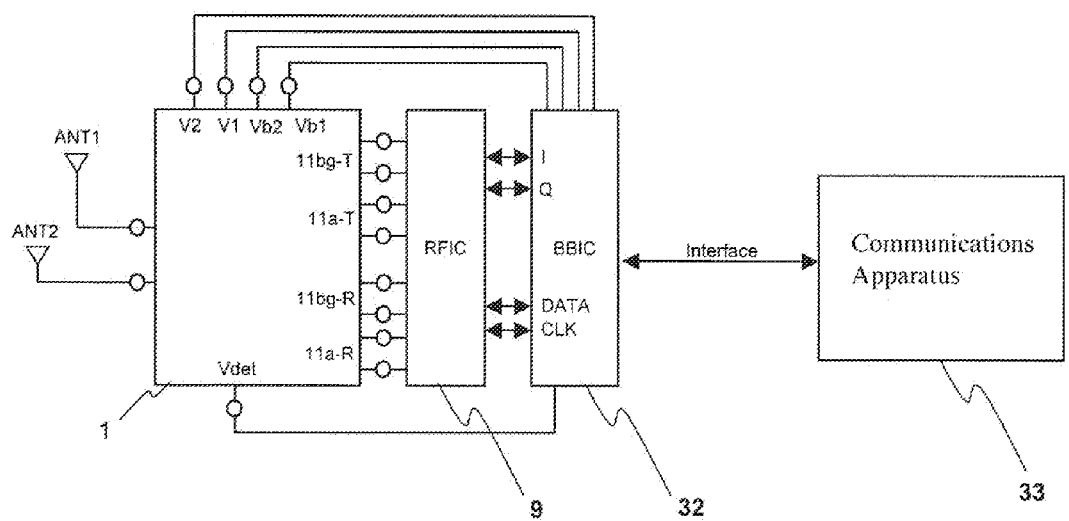
FIG. 31 is a block diagram showing the multi-band communications apparatus according to one embodiment of the present invention.
Figure 32:
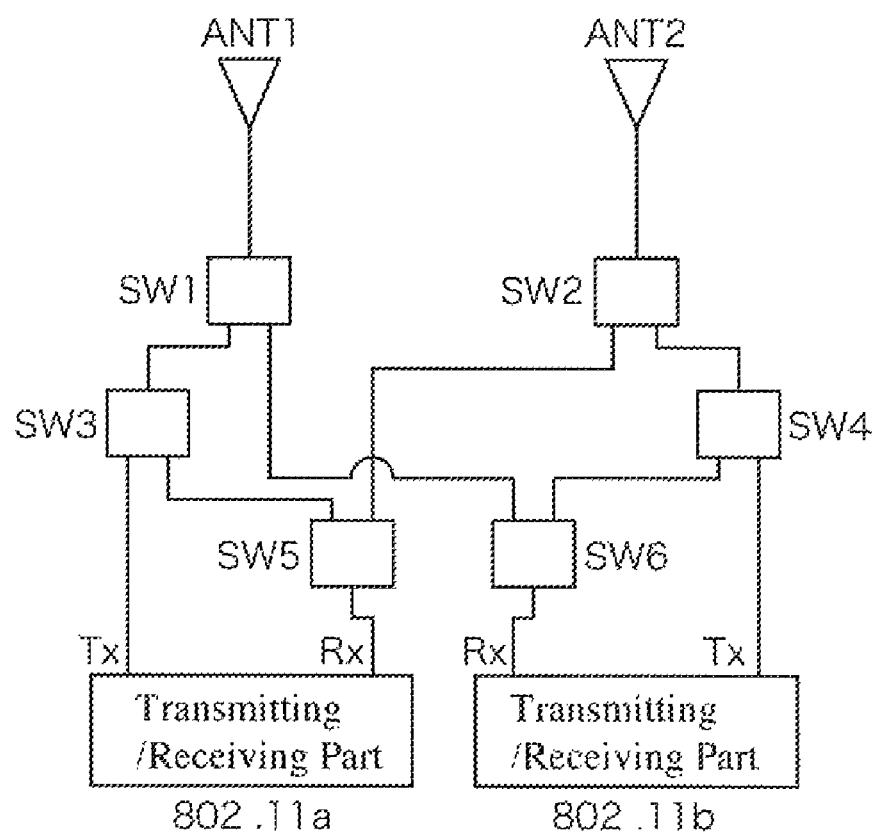
FIG. 32 is a block diagram showing the multi-band communications apparatus described in JP2003-169008A.

FIG. 31 is a block diagram showing the multi-band communications apparatus of the present invention. The transmitting/receiving terminals 11bg-T, 11a-T, 11bg-R, 11a-R of the high-frequency component 1 are connected to RFIC 9, which is connected to the base band IC 32 for communicating with a communications apparatus 33 through an interface. In the case of transmitting data, the data sent from the communications apparatus 33 is converted to an IQ signal by the base band IC 32, modulated to a high-frequency signal by the RFIC 9, and input to the transmitting terminal 11bg-T or 11a-T of the high-frequency component 1. The high-frequency signal amplified by the power amplifier is radiated from the antenna ANT1 or ANT2. In the case of receiving data, a high-frequency signal input from the antenna ANT1 or ANT2 is input to the RFIC 9 via the receiving terminal 11bg-R or 11a-R of the high-frequency component 1, and demodulated to an IQ signal. The IQ signal is converted to data by the base band IC 32, and then transmitted to the communications apparatus 33. The high-frequency component circuit 1 is controlled by the base band IC 32 via the control terminals V1, V2, Vb1, Vb2. The output level of the power amplifier can be controlled by adjusting the output power of the RFIC 9 by the base band IC 32 with reference to the level of the voltage detection terminal Vdet. The selection of antennas and modulation systems such as IEEE802.11a, IEEE802.11b and IEEE802.11g is preferably determined by examining the receiving sensitivity, which communications channels are vacant, etc. by the base band IC 32, such that communications are performed under the optimum conditions.

EFFECT OF THE INVENTION

The high-frequency circuit of the present invention having the above structure can activate a communications system receiving the most desired signal in data communications by WLAN, etc., using a small number of switch means while suppressing power consumption.

Such high-frequency circuit can be constructed as a small high-frequency component having a three-dimensional laminate structure, which is turned to a multi-band communications apparatus by adding a transmitting/receiving part for modulating transmitting data and demodulating received data in each communications system, and a circuit control part for controlling a high-frequency switch, a power amplifier, a low-noise amplifier, etc. The multi-band communications apparatus of the present invention is useful as a wireless signal-transmitting/receiving device in personal computers (PCs); PC peripherals such as printers, memory devices, broadband rooters, etc.; electronic apparatuses such as facsimiles, refrigerators, standard-definition televisions (SDTVs), high-definition televisions (HDTVs), digital cameras, digital video-cameras, cell phones, etc.; mobile vehicles such as automobiles, aircrafts, etc.

What is claimed is:

1. A high-frequency circuit used in a dual-band wireless apparatus for wireless communications selectively using first and second frequency bands, the high-frequency circuit comprising:
   one or more antenna terminals each connected to an antenna capable of transmitting and receiving signals in said first and second frequency bands;
   a first transmitting terminal, to which a transmitting signal in said first frequency band is input;

a second transmitting terminal, to which a transmitting signal in said second frequency band is input;

a first receiving terminal, from which a received signal in said first frequency band is output;

a second receiving terminal, from which a received signal in said second frequency band is output;

a switch circuit for switching the connection between said antenna terminals and said first and second transmitting terminals or said first and second receiving terminals; and a bandpass filter circuit disposed between said antenna terminals and at least one of said first and second transmitting and receiving terminals, said switch circuit comprising:

a first diplexer circuit disposed on the transmitting terminal side for permitting a high-frequency signal from one of said first and second transmitting terminals to go to the antenna terminal side but not to the other transmitting terminal, and a second diplexer circuit disposed on the receiving terminal side for dividing a high-frequency signal received through said antenna terminals to said first or second receiving terminal, wherein said first or second diplexer circuit comprises a low-frequency filter circuit and a high-frequency filter circuit, said low frequency filter circuit being constituted by a phase line connected to a common terminal of the diplexer circuits, and a bandpass filter circuit connected to said phase line, said first and second diplexer circuits are disposed in separate regions in a laminate comprising a plurality of layers, such that said first and second diplexer circuits do not mutually overlap in a laminate direction, at least part of said first and second diplexer circuits are formed on the same layers, and a planar ground electrode is disposed between an uppermost layer among the layers on which at least part of said first and second diplexer circuits are formed and an upper surface of said laminate.

2. A multi-band communications apparatus comprising the high-frequency circuit recited in claim 1, which comprises a transmitting/receiving part for demodulating transmitting data and received data in each communications system, and circuit control part for controlling said switch circuits and/or said power amplifier circuits.

3. A high-frequency component comprising a high-frequency circuit, said high-frequency component comprising an integral laminate of pluralities of dielectric ceramic layers with electrode patterns and at least one element mounted on a surface of said laminate, and said high-frequency component being disposed between an antenna capable of transmitting and receiving signals in pluralities of frequency bands and an integrated circuit handling high-frequency signals, said high-frequency circuit comprising:

one or more antenna terminals, each connected to said antenna;

transmitting terminals, to which transmitting signals in said pluralities of frequency bands are input;

receiving terminals from which receiving signals in said pluralities of frequency bands are output;

a switch circuit for outputting a receiving signal input from said antenna terminals to a predetermined receiving terminal and for outputting a transmitting signal input from said transmitting terminals to said antenna terminals;

bandpass filter circuits disposed between said antenna terminals and at least one of said transmitting terminals and at least one of said receiving terminals;

at least part of inductance elements and capacitance elements in said high-frequency circuit being constituted by said electrode patterns; and a semiconductor element constituting said switch circuits being mounted on a surface of said laminate, wherein said bandpass filter circuits are formed in said laminate, each bandpass filter circuit is disposed in each corner area of said laminate without other circuit blocks between each bandpass filter circuit and the edge of said laminate in each corner area, and said bandpass filter circuits comprise two or more transmitting line resonators each having one end grounded, as main components, the transmitting lines of said resonators of said bandpass filter circuits extending in the same direction.

4. A multi-band communications apparatus comprising the high-frequency component recited in claim 3, which comprises a transmitting/receiving part for demodulating transmitting data and received data in each communications system, and a circuit control part for controlling said switch circuits.

5. A high-frequency component comprising a high-frequency circuit, said high-frequency component comprising an integral laminate of pluralities of dielectric ceramic layers with electrode patterns and at least one element mounted on a surface of said laminate, and said high-frequency component being disposed between an antenna capable of transmitting and receiving signals in pluralities of frequency bands and an integrated circuit handling high-frequency signals, said high-frequency circuit comprising:

one or more antenna terminals each connected to said antennas;

transmitting terminals, to which transmitting signals in said pluralities of frequency bands are input;

receiving terminals, from which receiving signals in said pluralities of frequency bands are output:

a switch circuit for outputting a receiving signal input from said antenna terminals to a predetermined receiving terminal and for outputting a transmitting signal input from said transmitting terminals to said antenna terminals;

at least one of bandpass filter circuits disposed between said antenna terminals and at least one of said transmitting and receiving terminals;

at least part of inductance elements and capacitance elements in said high-frequency circuit being constituted by said electrode patterns; and a semiconductor element constituting said switch circuits being mounted on a surface of said laminate; wherein each bandpass filter circuit is disposed in each corner area of said laminate without other circuit blocks between each bandpass filter circuit and the edge of said laminate in each corner area, and said bandpass filter circuits comprise two or more transmitting line resonators each having one end grounded, as main components, said transmitting line resonators of said bandpass filter circuits extending in parallel to said edge of said laminate.

6. A multi-band communications apparatus comprising the high-frequency component recited in claim 5, which comprises a transmitting/receiving part for demodulating transmitting data and received data in each communications system, and a circuit control part for controlling said switch circuits.

7. A high-frequency component comprising a high-frequency circuit, said high-frequency component comprising an integral laminate of pluralities of dielectric ceramic layers with electrode patterns and at least one element mounted on a surface of said laminate, and said high-frequency component being disposed between an antenna capable of transmitting and receiving signals in pluralities of frequency bands and an integrated circuit handling high-frequency signals, said high-frequency circuit comprising:

one or more antenna terminals each connected to said antenna;

transmitting terminals, to which transmitting signals in said pluralities of frequency bands are input;

receiving terminals, from which receiving signals in said pluralities of frequency bands are output:

a switch circuit for outputting a receiving signal input from said antenna terminals to a predetermined receiving terminal and for outputting a transmitting signal input from said transmitting terminals to said antenna terminals;

at least one of bandpass filter circuits disposed between said antenna terminals and at least one of said transmitting and receiving terminals;

at least part of inductance elements and capacitance elements in said high-frequency circuit being constituted by said electrode patterns, a semiconductor element constituting said switch circuit being mounted on a surface of said laminate, wherein said switch circuit comprises a first diplexer circuit disposed on the transmitting terminal side and a second diplexer circuit disposed on the receiving terminal side, said first and second diplexer circuits are disposed in separate regions in said laminate such that said first and second diplexer circuits do not mutually overlap in a laminate direction, at least part of said first and second diplexer circuits are formed on the same layers, and a planar ground electrode is disposed between an uppermost layer among the layers on which at least part of said first and second diplexer circuits are formed and an upper surface of said laminate.

8. The high-frequency component according to claim 7, wherein said high-frequency circuit further comprises:

a first power amplifier circuit disposed between said switch circuit and one of said transmitting terminals;

a second power amplifier circuit disposed between said switch circuit and one of said transmitting terminals; and a detection circuit having a voltage detection terminal for monitoring the output power of said first and second power amplifier circuits;

wherein said detection circuit comprises a coupling circuit connected to the output paths of said first and second power amplifier circuits, and a detection diode connected to the coupling terminal of said coupling circuit, whereby a high-frequency signal is caused to pass through said coupling circuit so that its high-frequency power is detected by said detection diode, and the detected voltage is output to said voltage detection terminal.

9. The high-frequency component according to claim 8, wherein said coupling circuit is connected to a common terminal of said first diplexer circuit or an antenna terminal.

10. The high-frequency component according to claim 8, wherein a harmonics-reducing circuit is disposed between the coupling terminal of said coupling circuit and said detection diode.

11. The high-frequency component according to claim 10, wherein said harmonics-reducing circuit is a lowpass filter circuit, a notch filter circuit or an attenuator circuit.

12. The high-frequency component according claim 7, wherein a lowpass filter circuit or a notch filter circuit is disposed between a power amplifier circuit and said antenna terminals.

13. The high-frequency component according to claim 7, wherein a balanced-unbalanced conversion circuit is connected to at least one of said transmitting terminals, and/or at least one of said receiving terminals.

14. The high-frequency component according to claim 7, wherein the high-frequency circuit further comprises a low-noise amplifier circuit, and the low-noise amplifier circuit is connected to at least one of said receiving terminals.

15. The high-frequency component according to claim 14, wherein a lowpass filter circuit or a notch filter circuit is disposed between said low-noise amplifier circuit and said antenna terminals.

16. The high-frequency component comprising the high-frequency circuit recited in claim 14, which comprises an integral laminate of pluralities of dielectric ceramic layers with electrode patterns, said high-frequency component being disposed between an antenna capable of transmitting and receiving signals in pluralities of frequency bands and an integrated circuit handling high-frequency signals.

17. The high-frequency component comprising the high-frequency circuit recited in claim 7, which comprises an integral laminate of pluralities of dielectric ceramic layers with electrode patterns, said high-frequency component being disposed between an antenna capable of transmitting and receiving signals in pluralities of frequency bands and an integrated circuit handling high-frequency signals.

18. A multi-band communications apparatus comprising the high-frequency circuit recited in claim 7, which comprises a transmitting/receiving part for demodulating transmitting data and received data in each communications system, and circuit control part for controlling at least one selected from the group consisting of said switch circuits and said low-noise amplifier circuit.

19. A multi-band communications apparatus comprising the high-frequency component recited in claim 7, which comprises a transmitting/receiving part for demodulating transmitting data and received data in each communications system, and circuit control part for controlling at least one selected from the group consisting of said switch circuits and said low-noise amplifier circuit.

20. A multi-band communications apparatus comprising the high-frequency component recited in claim 7, which comprises a transmitting/receiving part for demodulating transmitting data and received data in each communications system, and a circuit control part for controlling said switch circuits.

* * * * *